United States Patent

Kneezel et al.

[11] Patent Number: 5,939,206
[45] Date of Patent: Aug. 17, 1999

[54] STABILIZED POROUS, ELECTRICALLY CONDUCTIVE SUBSTRATES

[75] Inventors: Gary A. Kneezel, Webster; Ram S. Narang, Fallport; Timothy J. Fuller, Pittsford; Peter J. John, Rochester, all of N.Y.

[73] Assignee: Xerox Corporation, Stamford, Conn.

[21] Appl. No.: 08/705,916

[22] Filed: Aug. 29, 1996

[51] Int. Cl.⁶ .................................................. B32B 27/06
[52] U.S. Cl. .................... 428/480; 428/209; 428/901; 174/256; 174/258; 174/260; 257/713
[58] Field of Search .................................. 257/701, 702, 257/713; 428/209, 480, 901; 174/256, 258, 260

[56] References Cited

U.S. PATENT DOCUMENTS

| | | | |
|---|---|---|---|
| 2,125,968 | 8/1938 | Theimer | 260/153 |
| 3,367,914 | 2/1968 | Herbert | 260/52 |
| 3,455,868 | 7/1969 | D'Alessandro | 260/38 |
| 3,914,194 | 10/1975 | Smith | 260/18 R |
| 4,003,812 | 1/1977 | Scala et al. | 204/181 |
| 4,110,279 | 8/1978 | Nelson et al. | 260/19 R |
| 4,320,224 | 3/1982 | Rose et al. | 528/125 |
| 4,391,933 | 7/1983 | Scala et al. | 523/454 |
| 4,425,467 | 1/1984 | Alvino et al. | 524/600 |
| 4,435,496 | 3/1984 | Walls et al. | 430/285 |
| 4,533,448 | 8/1985 | Scala et al. | 204/181.7 |
| 4,623,558 | 11/1986 | Lin | 427/44 |
| 4,642,170 | 2/1987 | Alvino et al. | 204/181.4 |
| 4,667,010 | 5/1987 | Eldin | 528/125 |
| 5,160,945 | 11/1992 | Drake | 346/140 R |
| 5,192,959 | 3/1993 | Drake et al. | 346/140 R |
| 5,234,990 | 8/1993 | Flaim et al. | 524/609 |
| 5,268,444 | 12/1993 | Jensen et al. | 528/125 |
| 5,272,113 | 12/1993 | Quina | 437/205 |
| 5,336,720 | 8/1994 | Richards | 525/78 |
| 5,438,082 | 8/1995 | Helmer-Metzmann et al. | 522/149 |
| 5,561,202 | 10/1996 | Helmer-Metzmann et al. | 525/471 |
| 5,681,888 | 10/1997 | Nomura et al. | 524/496 |

FOREIGN PATENT DOCUMENTS

| | | |
|---|---|---|
| 0698823 | 2/1996 | European Pat. Off. . |
| 04294148 | 10/1992 | Japan . |

OTHER PUBLICATIONS

Chloromethylateion of Condensation Polymeras Cont. an Oxy–1,4 Phenylene Backbone, Polymer Preprints (1979) vol. 20 (1), 835 Wm H. Daley Supon Chotiwana & Ralph Nielsen.

Chloromethylstyrene: Synthesis, Polymerization, Transformations, Applications JMS–Rev. Macromol. Chem. Phys., C22(3), 343–407 (1982–83) Marcel Camps, Michel Chatzopoulos 8 Jean–Pierre Monthérd.

Pulse Radiolysis Studies on the Mechanism of the High Sensitivity of Chloromethylated Polystyrene as an Electron Negative Resist Lithography 25(1) 287 (1984) Y. Tabarta, S. Tagawa, & M Washio.

Deep UV Photochemistry of Copolymers of Trimethylsilymethyl Methacrylate and Chlorometheylstyrene, Polymer Preprints 29 (1) 1988, M. J. Jurek, A. E. Novembre I. P. Heyward, R. Gooden, E. Reichmanis.

Poly (arylene ethers) Polymer vol. 29, 1988, Feb. p. 358 P.M. Hergenrother, B.J. Jensen & S.J. Havens.

Ethynyl–Terminated Polyarylates: Synthesis & Characterization J. Polymer Science: Polymer Chemistry Ed. vol. 22 3011–3025 (1984) ccc 0360–6376/84/113011–15304.00 S. J. Havens, P.M. Hergenrother.

(List continued on next page.)

Primary Examiner—Deborah Jones
Assistant Examiner—Cathy F. Lam
Attorney, Agent, or Firm—Judith L. Byorick

[57] ABSTRACT

Disclosed is an apparatus which comprises at least one semiconductor chip mounted on a substrate, said substrate comprising a porous, electrically conductive member having electrophoretically deposited thereon a coating of a polymeric material. In one embodiment, the semiconductor chips are thermal ink jet printhead subunits.

10 Claims, 10 Drawing Sheets

OTHER PUBLICATIONS

Flare, a Low Dielectric Constant, High Tg, Thermally Stable Poly(arylene) ether) . . . Polymer Preprints 37(1) 150 (1996) N.H. Hendricks and K.S.Y. Lau.

Styrene Terminated Resins as Interlevel Dietelectrics for Multichip Modules 32 (2) 178 (1991) Joseph J. Zupancic Daniel C. Blazej, Thomas G. Baker, and Edmund A. Dinkel.

Functional polymers and sequential copolymers by phase transfers catalysis $2^a$ Makromol Chem., 185, 1867–1880 (1984) Virgil Percec, Brian C. Auman.

Functional Polymers and sequential copolymers for phase transfer Catalypsis $3^{a,}$) Makromol. Chem. 185, 2319–2336 (1984) Virgil Percec, Brian C. Auman.

Functional Polymers and Sequential Copolymers by Phase Transfer Catalysis—Polymer Bulletin 10, 223–230 (1983) Virgil Percec and Peter L. Rinaldi.

A New Preparation of Chloromethyl Methyl Ether Free of Bis(chloromethyl) Ether. Synthesis 970 (1979) J.S. Amasto, S. Karady, M. Sletzinger, L.M. Weinstock).

A Simple and Intexpensive Procedure for Chloromethylation of Certain Aromatic Compounds, Tetrahedron Letters vol. 24, No. 18, pp. 1933–1936, (1983) Alexander McKillop, Ferahedron Abbasi Madjdabadi and David A. Long.

Synthesis of Intermediates for Production of Heat Resistant Polymers (Chloromethylation of Diphenyl Oxide) Zhurnal Prikladnoi Khimii, vol. 40 No. 11, pp. 2540–2546 Nov., 1967.

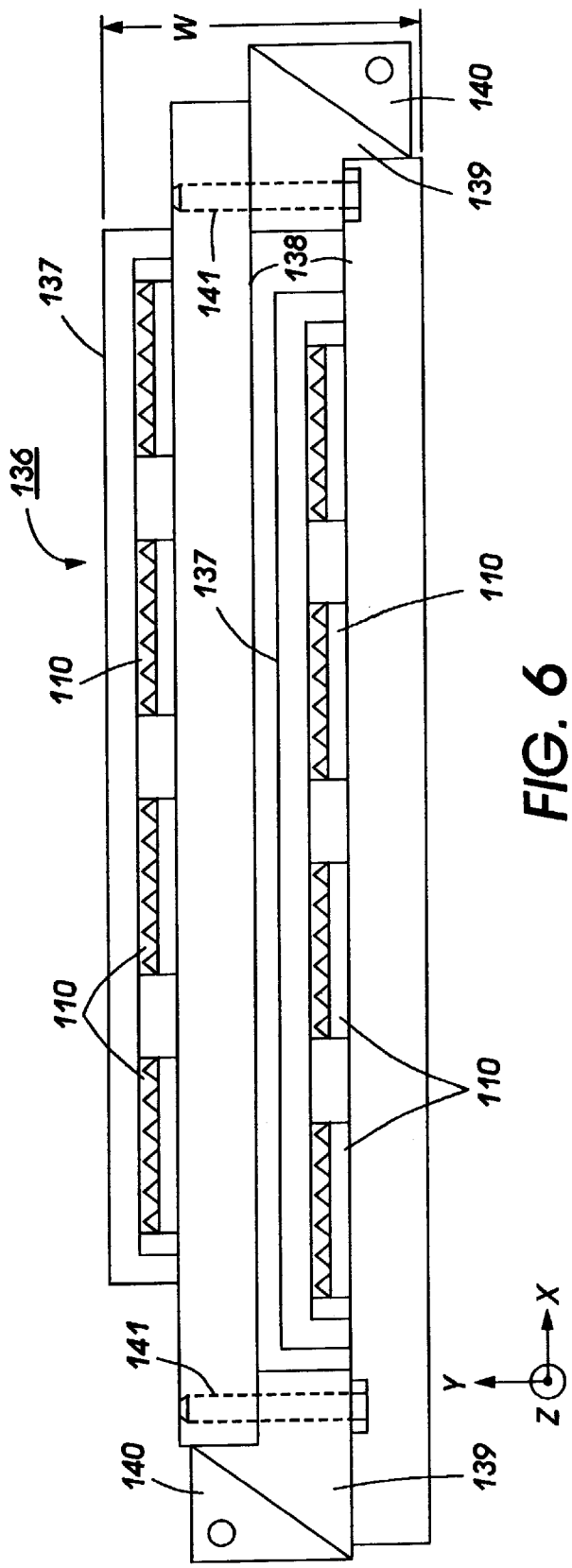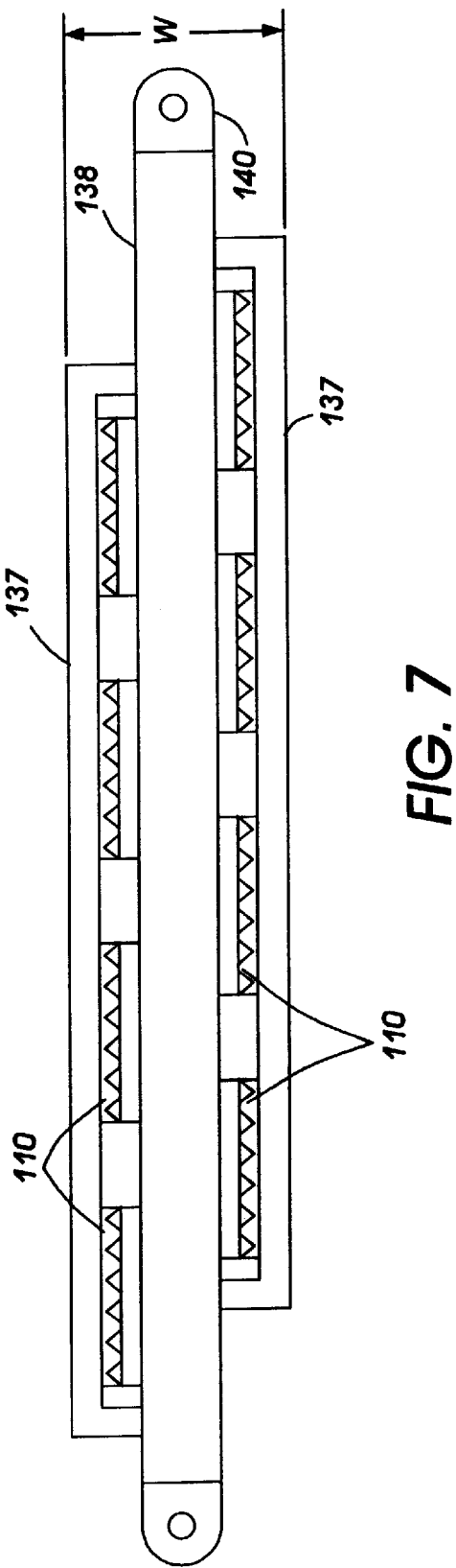

STABILIZED POROUS, ELECTRICALLY CONDUCTIVE SUBSTRATES

BACKGROUND OF THE INVENTION

The present invention is directed to substrates suitable for mounting one or more semiconductor chips. More specifically, the present invention is directed to apparatus which comprise one or more semiconductor chips mounted on a porous, electrically conductive substrate, said substrate having electrophoretically deposited thereon a coating of a polymeric material. One embodiment of the present invention is directed to an apparatus which comprises at least one semiconductor chip mounted on a substrate, said substrate comprising a porous, electrically conductive member having electrophoretically deposited thereon a coating of a polymeric material. Another embodiment of the present invention is directed to a process for preparing a substrate having at least one semiconductor chip mounted thereon, said process comprising: (a) providing a porous, electrically conductive substrate; (b) preparing a colloidal emulsion containing charged micelles of an organic material; (c) placing the substrate and a second electrode in contact with the colloidal emulsion; (d) applying an electrical field between the substrate and the second electrode, thereby electrophoretically depositing a polymeric coating of the organic material on the substrate; and (e) permanently mounting at least one semiconductor chip on the coated substrate. Yet another embodiment of the present invention is directed to a thermal ink jet printer for ejecting a recording liquid onto a recording medium, said printer comprising a printhead which comprises at least a channel for holding the recording liquid, at least one nozzle for ejecting the recording liquid onto the recording medium, and a heating element situated so as to enable selective heating of the ink in the channel, thereby causing ink in the channel to be ejected from the nozzle, said printhead being permanently mounted on a porous, electrically conductive substrate, said substrate having electrophoretically deposited thereon a coating of a polymeric material.

Image sensors for scanning document images, such as charge coupled devices, typically have a row or linear array of photosites together with suitable supporting circuitry integrated onto a silicon chip. Usually, a sensor is used to scan line by line across the width of a document with the document being moved or stepped lengthwise in synchronism therewith. A typical architecture for such a sensor array is given, for example, in U.S. Pat. No. 5,153,421. In a scanning system, the image resolution is proportional to the ratio of the scan width and the number of array photosites. Because of the difficulty in economically designing and fabricating an array of photosites comparable in length to the width of an image, optical reduction of the scan line to a length considerably shorter than the actual width of the image is fairly common in scanners and facsimile machines currently available. Because of the optical reduction, image resolution typically available today is relatively low when used to scan a full line. A long or full-width array having a length equal to or larger than the document line and with a large packing of co-linear photosites to assure high resolution has been and remains a very desirable aim. In the pursuit of a long or full-width array, forming the array by assembling several small chips together end to end has often been postulated. Semiconductor chips for applications other than charge coupled devices are also frequently mounted on substrates; such applications include, but are not limited to, other types of photosensitive semiconductor chips, light-emitting diode print bars, chips related to thermal ink jet technology, or the like.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are different types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to vaporize almost instantaneously and create a bubble. The ink at the orifice is forced out as a propelled droplet as the bubble expands. When the channel refills and the hydrodynamic motion of the ink substantially stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses. At this point, the resistor is no longer being heated because the current pulse has passed and, concurrently with the bubble collapse, the droplet is propelled at a high rate of speed in a direction towards a recording medium. The surface of the printhead at or near the resistor encounters a severe cavitational force by the collapse of the bubble, which tends to erode it. Subsequently, the ink channel refills by capillary action. This entire bubble formation and collapse sequence occurs in about 10 microseconds. The channel can be refired after 50 to 500 microseconds minimum dwell time to enable the channel to be refilled and to enable the dynamic refilling factors to become somewhat dampened. Thermal ink jet equipment and processes are well known and are described in, for example, U.S. Pat. No. 4,601,777, U.S. Pat. No. 4,251,824, U.S. Pat. No. 4,410,899, U.S. Pat. No. 4,412,224, U.S. Pat. No. 4,532,530, and U.S. Pat. No. 4,774,530, the disclosures of each of which are totally incorporated herein by reference.

In ink jet printing, a printhead is usually provided having one or more ink-filled channels communicating with an ink supply chamber at one end and having an opening at the opposite end, referred to as a nozzle. These printheads form images on a recording medium such as paper by expelling droplets of ink from the nozzles onto the recording medium. The ink forms a meniscus at each nozzle prior to being expelled in the form of a droplet. After a droplet is expelled, additional ink surges to the nozzle to reform the meniscus.

In thermal ink jet printing, a thermal energy generator, usually a resistor, is located in the channels near the nozzles a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. The rapidly expanding vapor bubble pushes the column of ink filling the channel towards the nozzle. At the end of the current pulse the heater rapidly cools and the vapor bubble begins to collapse. However, because of inertia, most of the column of ink that received an impulse from the exploding bubble continues its forward motion and is ejected from the nozzle as an ink drop. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper. The printhead is typically mounted on a substrate, which preferably functions as a heat sink.

There are two general configurations for thermal drop-on-demand ink jet printheads. In one configuration, droplets are propelled from nozzles in a direction parallel to the flow of ink in ink channels and parallel to the surface of the bubble-generating heating elements of the printhead, such as, for example, the printhead configuration disclosed in U.S. Pat. No. Re. 32,572, the disclosure of which is totally incorporated herein by reference. This configuration is sometimes referred to as an edge shooter or a side shooter. The other thermal ink jet configuration propels droplets from nozzles in a direction normal to the surface of the bubble-generating heating elements, such as, for example, the printhead disclosed in U.S. Pat. No. 4,568,953, the disclosure of which is totally incorporated herein by reference. This configuration is sometimes referred to as a roofshooter. A fundamental difference between the two configurations lies in the direction of droplet ejection, in that the side shooter configuration ejects droplets in the plane of the substrate having the heating elements, whereas the roofshooter ejects droplets out of the plane of the substrate having the heating elements and in a direction normal thereto.

Thermal ink jet printheads can be used in carriage-type printers for printing swaths of information and then stepping the recording medium a distance of one swath and continuing to print adjacent swaths of information until a full page has been printed. Alternatively, the printheads can be assembled as subunits of a partial or full page width printhead and arranged on a structural imaging bar for printing. In page width printing, the printheads may be assembled by abutting a plurality of the printhead subunits end-to-end on the image bar or by staggering them on two separate image bars or on opposite sides of the same image bar. The fabrication approaches for making either large array or pagewidth thermal ink jet printheads generally fall into two categories, namely monolithic approaches, in which one or both of the printhead components (heater plate and channel plate) are a single large array of page width size, and subunit approaches, in which smaller subunits are combined to form the large array or page width print bar. The subunit approach tends to result in a higher yield of usable subunits if they can be aligned precisely with respect to each other.

U.S. Pat. No. 5,160,945 (Drake), the disclosure of which is totally incorporated herein by reference, discloses a page width thermal ink jet printhead of the type assembled from fully functional roofshooter type printhead subunits fixedly mounted on the surface of one side of a structural bar. A passageway is formed adjacent to the bar side surface containing the printhead subunits with openings provided between the passageway and the ink inlets of the printhead subunits mounted thereon, so that ink supplied to the passageway in the bar will maintain the individual subunits full of ink. The size of the printing zone for color printing is minimized because the roofshooter printhead subunits are mounted on one edge of the structural bar and may be stacked one on top of the other without need to provide space for the printhead subunits and/or ink supply lines. In addition, the structural bar thickness enables the bar to be massive enough to prevent warping because of printhead operating temperatures.

U.S. Pat. No. 5,192,959 (Drake et al.), the disclosure of which is totally incorporated herein by reference, discloses a mechanism for accurately mounting a large area semiconductive device within a larger system. The semiconductive device, formed by the linear abutment of semiconductive subunits divided from a larger semiconductive wafer, must be accurately positioned to enable the operation of which it was intended. In one embodiment, the subunits are thermal ink jet arrays which are abutted to form a page width printhead. The semiconductive device includes a reference plate or substrate having a generally planar surface for mounting an array of functional subunits thereon. The semiconductive device further includes two or more individual subunits which are also affixed to the planar surface, thereby forming alignment pads for the assembled semiconductive device. When incorporated into the system, the alignment pads are received by frame members or alignment points to provide positive alignment of the reference plate and the attached array of subunits within the system.

U.S. Pat. No. 5,272,113 (Quinn), the disclosure of which is totally incorporated herein by reference, discloses semiconductor chips, such as photosensor arrays in a full-width scanner, which are mounted on a substrate to maintain reasonably consistent spacing among chips regardless of temperature conditions during use. After chips are tacked onto the substrate with uncured epoxy, the assembly is brought to a low temperature prior to the heating of the curing step. The technique permits design of the assembly to compensate for differences between the thermal coefficient of expansion of the chips and that of the substrate, while also minimizing mechanical stresses on the chips caused by heating in the course of use.

Additional examples of large array or page width thermal ink jet printheads are disclosed in, for example, U.S. Pat. No. 4,985,710, U.S. Pat. No. 4,935,750, U.S. Pat. No. 4,851,371, U.S. Pat. No. 4,829,324, U.S. Pat. No. 4,822,755, U.S. Pat. No. 4,712,018, U.S. Pat. No. 4,690,391, and U.S. Pat. No. 4,463,359, the disclosures of each of which are totally incorporated herein by reference.

U.S. Pat. No. 4,642,170 (Alvino et al.), the disclosure of which is totally incorporated herein by reference, discloses a method of electrophoretically depositing a coating of polysulfones or polyethersulfones on a conductive substrate. An amine-free solution is formed in an organic solvent of the polysulfones or polyethersulfones. An emulsion is formed by combining the solution with an organic non-solvent for the polymer which contains up to about 0.6 parts by weight of an organic nitrogen containing base per parts by weight of the polymer. A direct current is applied between a conductive substrate and the emulsion which results in the deposition of the polymer on the substrate.

U.S. Pat. No. 4,425,467 (Alvino et al.), the disclosure of which is totally incorporated herein by reference, discloses a method of making a nonaqueous emulsion from which a polymer can be electrodeposited. A mixture is prepared of about 50 to about 150 parts by weight of a nonaqueous organic, nonelectrolizable, nonsolvent for the polymer with about 0.8 to about 1.2 parts by weight of a nitrogen-containing base which can be a tertiary amine, an imidazole, or mixture of a tertiary amine and an imidazole. To the mixture is added a solution of 1 part by weight of the polymer which can be a polyamic acid, a polyamide imide, a polyimide, a polyparabanic acid, a polysulfone, or a mixture of these polymers. The polymer is in a nonaqueous, organic, nonelectrolizable aprotic solvent such as N-methyl-2-pyrrolidone.

U.S. Pat. No. 4,533,448 (Scala et al.), the disclosure of which is totally incorporated herein by reference, discloses an electrodepositable emulsion which comprises a soluble un-ionized polymer containing an amic acid or amide linking group, a non-electrolyzable organic solvent for the polymer and a nonelectrolyzable organic nonsolvent for the polymer. The weight ratio of the solvent to the nonsolvent is about 0.1 to about 0.5 and the polymer is about 0.4 to about 5 percent by weight of the weight of the solvent. No amine or surface active agent is used. A workpiece is coated with the polymer by placing it into the emulsion about one-half to about two inches away from the cathode. Constant dc voltage is applied between the cathode and the workpiece until a coating of a desired thickness has been deposited on the workpiece. The workpiece is then removed, dried, and cured.

U.S. Pat. No. 4,391,933 (Scala et al.), the disclosure of which is totally incorporated herein by reference, discloses an emulsion which comprises about 8 to about 20 percent of a solvent, about 0.5 to 5 percent of an epoxy resin dissolved in the solvent to form a discontinuous phase, about 75 to about 90 percent of a precipitant as the continuous phase, and an emulsifier in an amount sufficient to react stoichiometrically with the epoxy and hydroxyl groups on the epoxy resin up to about 900% in excess of stoichiometric. A conductive workpiece is placed in the emulsion about ½ to about 2 inches from an electrode which is also immersed in the emulsion. A direct electric current potential is applied between the workpiece and the electrode with the workpiece as the anode. About 50 to about 400 volts and about 2 to about 50 milliamperes are used until a coating of the desired thickness has been deposited on the workpiece. The solvent and precipitant are preferably ketones such as cyclohexanone, and methylethylketone or isobutylketone, respectively. The epoxy resin is preferably a bisphenol A epoxy resin having an average molecular weight of about 2000 to about 15,000. The emulsifier is preferably an amine.

Copending application U.S. Ser. No. 08/705,914, filed Aug. 29, 1996 now abandoned, entitled "Thermal Ink Jet Printhead With Ink Resistant Heat Sink Coating," with the named inventors Ram S. Narang and Timothy J. Fuller, the disclosure of which is totally incorporated herein by reference, discloses a heat sink for a thermal ink jet printhead having improved resistance to the corrosive effects of ink by coating the surface of the heat sink with an ink resistant film formed by electrophoretically depositing a polymeric material on the heat sink surface. In one described embodiment, a thermal ink jet printhead is formed by bonding together a channel plate and a heater plate. Resistors and electrical connections are formed in the surface of the heater plate. The heater plate is bonded to a heat sink comprising a zinc substrate having an electrophoretically deposited polymeric film coating. The film coating provides resistance to the corrosion of higher pH inks. In another embodiment, the coating has conductive fillers dispersed therethrough to enhance the thermal conductivity of the heat sink. In one embodiment, the polymeric material is selected from the group consisting of polyethersulfones, polysulfones, polyamides, polyimides, polyamide-imides, epoxy resins, polyetherimides, polyarylene ether ketones, chloromethylated polyarylene ether ketones, acryloylated polyarylene ether ketones, polystyrene and mixtures thereof.

Copending application U.S. Ser. No. 08/703,138, filed Aug. 29, 1996 now U.S. Pat. No. 5,843,325, filed concurrently herewith, entitled "Method for Applying an Adhesive Layer to a Substrate Surface," with the named inventors Ram S. Narang, Stephen F. Pond, and Timothy J. Fuller, the disclosure of which is totally incorporated herein by reference, discloses a method for uniformly coating portions of the surface of a substrate which is to be bonded to another substrate. In a described embodiment, the two substrates are channel plates and heater plates which, when bonded together, form a thermal ink jet printhead. The adhesive layer is electrophoretically deposited over a conductive pattern which has been formed on the binding substrate surface. The conductive pattern forms an electrode and is placed in an electrophoretic bath comprising a colloidal emulsion of a preselected polymer adhesive. The other electrode is a metal container in which the solution is placed or a conductive mesh placed within the container. The electrodes are connected across a voltage source and a field is applied. The substrate is placed in contact with the solution, and a small current flow is carefully controlled to create an extremely uniform thin deposition of charged adhesive micelles on the surface of the conductive pattern. The substrate is then removed and can be bonded to a second substrate and cured. In one embodiment, the polymer adhesive is selected from the group consisting of polyamides, polyimides, polyamide-imides, epoxy resins, polyetherimides, polysulfones, polyether sulfones, polyarylene ether ketones, polystyrenes, chloromethyloted polyarylene ether ketones, acryloylated plyarylene ether ketones, and mixtures thereof.

Copending application U.S. Ser. No. 08/697,750, filed Aug. 29, 1996, filed concurrently herewith, entitled "Electrophoretically Deposited Coating For the Front Face of an Ink Jet Printhead," with the named inventors Ram S. Narang, Stephen F. Pond, and Timothy J. Fuller, the disclosure of which is totally incorporated herein by reference, discloses an electrophoretic deposition technique for improving the hydrophobicity of a metal surface, in one embodiment, the front face of a thermal ink jet printhead. For this example, a thin metal layer is first deposited on the front face. The front face is then lowered into a colloidal bath formed by a fluorocarbon-doped organic system dissolved in a solvent and then dispersed in a non-solvent. An electric field is created and a small amount of current through the bath causes negatively charged particles to be deposited on the surface of the metal coating. By controlling the deposition time and current strength, a very uniform coating of the fluorocarbon compound is formed on the metal coating. The electrophoretic coating process is conducted at room temperature and enables a precisely controlled deposition which is limited only to the front face without intrusion into the front face orifices. In one embodiment, the organic compound is selected from the group consisting of polyimides, polyamides, polyamide-imides, polysulfones, polyarylene ether ketones, polyethersulfones, polytetrafluoroethylenes, polyvinylidene fluorides, polyhexafluoro-propylenes, epoxies, polypentafluorostyrenes, polystyrenes, copolymers thereof, terpolymers thereof, and mixtures thereof.

Copending application U.S. Ser. No. 08/705,375, filed Aug. 29, 1996, filed concurrently herewith, entitled "Improved Curable Compositions," with the named inventors Timothy J. Fuller, Ram S. Narang, Thomas W. Smith, David J. Luca, and Ralph A. Mosher, the disclosure of which is totally incorporated herein by reference, discloses an improved composition comprising a photopatternable polymer containing at least some monomer repeat units with photosensitivity-imparting substituents, said photopatternable polymer being of the general formula

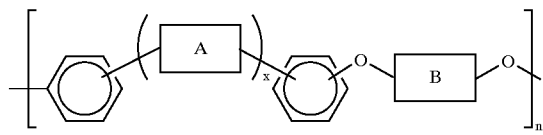

or

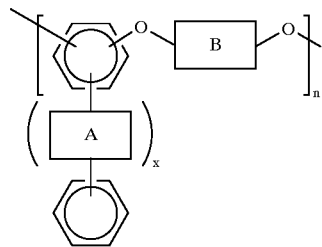

wherein x is an integer of 0 or 1, A is one of several specified groups, such as

B is one of several specified groups, such as

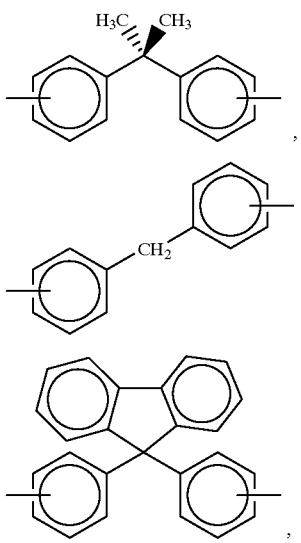

or mixtures thereof, and n is an integer representing the number of repeating monomer units. Also disclosed is a process for preparing a thermal ink jet printhead with the aforementioned polymer and a thermal ink jet printhead containing therein a layer of a crosslinked or chain extended polymer of the above formula.

Copending application U.S. Ser. No. 08/705,365, filed Aug. 29, 1996 now U.S. Pat. No. 5,849,809, filed concurrently herewith, entitled "Hydroxyalkylated High Performance Curable Polymers," with the named inventors Ram S. Narang and Timothy J. Fuller, the disclosure of which is totally incorporated herein by reference, discloses a composition which comprises (a) a polymer containing at least some monomer repeat units with photosensitivity-imparting substituents which enable crosslinking or chain extension of the polymer upon exposure to actinic radiation, said polymer being of the formula

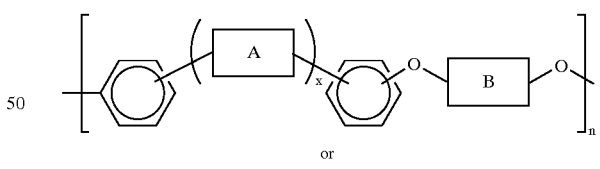

or

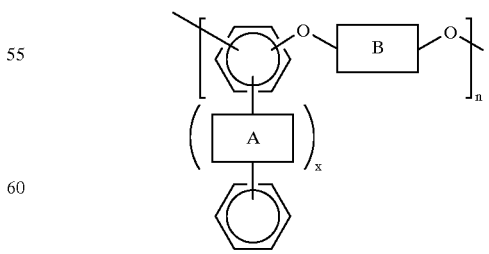

wherein x is an integer of 0 or 1, A is one of several specified groups, such as

B is one of several specified groups, such as

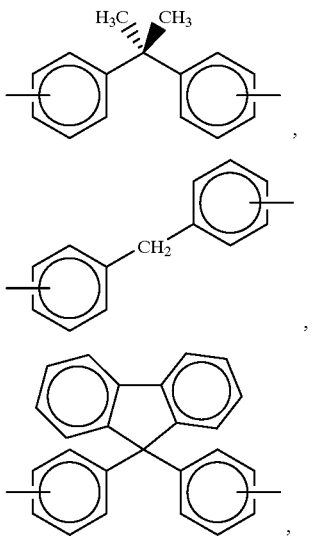

or mixtures thereof, and n is an integer representing the number of repeating monomer units, wherein said photosensitivity-imparting substituents are hydroxyalkyl groups; (b) at least one member selected from the group consisting of photoinitiators and sensitizers; and (c) an optional solvent. Also disclosed are processes for preparing the above polymers and methods of preparing thermal ink jet printheads containing the above polymers.

Copending application U.S. Ser. No. 08/705,488, filed Aug. 29, 1996 filed concurrently herewith, entitled "Improved High Performance Polymer Compositions," with the named inventors Thomas W. Smith, Timothy J. Fuller, Ram S. Narang, and David J. Luca, the disclosure of which is totally incorporated herein by reference, discloses a composition comprising a polymer with a weight average molecular weight of from about 1,000 to about 65,000, said polymer containing at least some monomer repeat units with a first, photosensitivity-imparting substituent which enables crosslinking or chain extension of the polymer upon exposure to actinic radiation, said polymer also containing a second, thermal sensitivity-imparting substituent which enables further polymerization of the polymer upon exposure to temperatures of about 140° C. and higher, wherein the first substituent is not the same as the second substituent, said polymer being selected from the group consisting of polysulfones, polyphenylenes, polyether sulfones, polyimides, polyamide imides, polyarylene ethers, polyphenylene sulfides, polyarylene ether ketones, phenoxy resins, polycarbonates, polyether imides, polyquinoxalines, polyquinolines, polybenzimidazoles, polybenzoxazoles, polybenzothiazoles, polyoxadiazoles, copolymers thereof, and mixtures thereof.

Copending application U.S. Ser. No. 08/697,761, filed Aug. 29, 1996 now U.S. Pat. No. 5,889,077, filed concurrently herewith, entitled "Process for Direct Substitution of High Performance Polymers with Unsaturated Ester Groups," with the named inventors Timothy J. Fuller, Ram S. Narang, Thomas W. Smith, David J. Luca, and Raymond K. Crandall, the disclosure of which is totally incorporated herein by reference, discloses a process which comprises reacting a polymer of the general formula

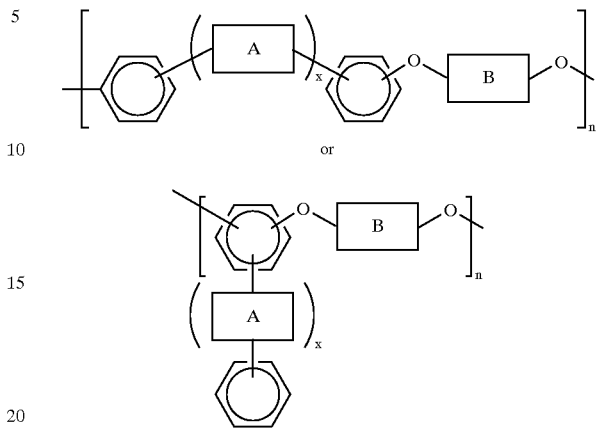

wherein x is an integer of 0 or 1, A is one of several specified groups, such as

B is one of several specified groups, such as

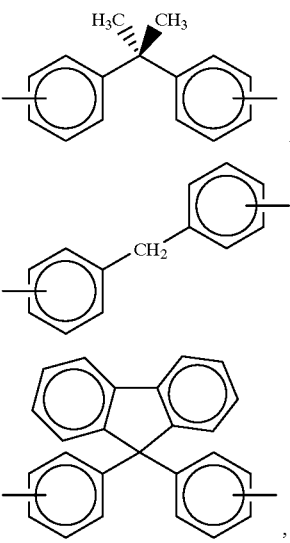

or mixtures thereof, and n is an integer representing the number of repeating monomer units, with (i) a formaldehyde source, and (ii) an unsaturated acid in the presence of an acid catalyst, thereby forming a curable polymer with unsaturated ester groups. Also disclosed is a process for preparing an ink jet printhead with the above polymer.

Copending application U.S. Ser. No. 08/705,463, filed Aug. 29, 1996 now U.S. Pat. No. 5,739,254, filed concurrently herewith, entitled "Process for Haloalkylation of High Performance Polymers," with the named inventors Timothy J. Fuller, Ram S. Narang, Thomas W. Smith, David J. Luca, and Raymond K. Crandall, the disclosure of which is totally incorporated herein by reference, discloses a process which comprises reacting a polymer of the general formula

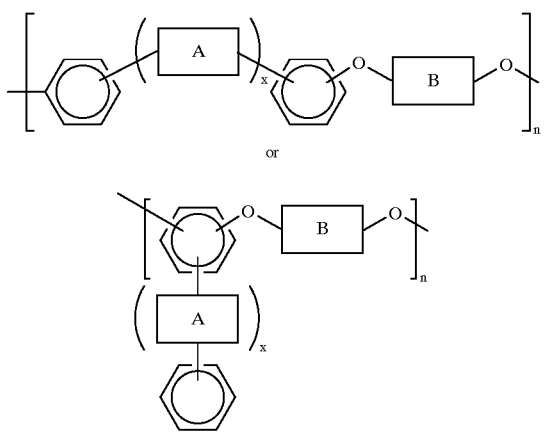

wherein x is an integer of 0 or 1, A is one of several specified groups, such as

B is one of several specified groups, such as

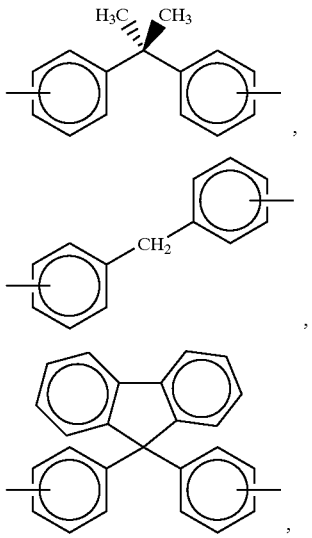

or mixtures thereof, and n is an integer representing the number of repeating monomer units, with an acetyl halide and dimethoxymethane in the presence of a halogen-containing Lewis acid catalyst and methanol, thereby forming a haloalkylated polymer. In a specific embodiment, the haloalkylated polymer is then reacted further to replace at least some of the haloalkyl groups with photosensitivity-imparting groups. Also disclosed is a process for preparing a thermal ink jet printhead with the aforementioned polymer.

Copending application U.S. Ser. No. 08/705,479, filed Aug. 29, 1996, filed concurrently herewith, entitled "Processes for Substituting Haloalkylated Polymers With Unsaturated Ester, Ether, and Alkylcarboxymethylene Groups," with the named inventors Timothy J. Fuller, Ram S. Narang, Thomas W. Smith, David J. Luca, and Raymond K. Crandall, the disclosure of which is totally incorporated herein by reference, discloses a process which comprises reacting a haloalkylated aromatic polymer with a material selected from the group consisting of unsaturated ester salts, alkoxide salts, alkylcarboxylate salts, and mixtures thereof, thereby forming a curable polymer having functional groups corresponding to the selected salt. Another embodiment of the invention is directed to a process for preparing an ink jet printhead with the curable polymer thus prepared.

Copending application U.S. Ser. No. 08/705,376, filed Aug. 29, 1996, filed concurrently herewith, entitled "Blends Containing Curable Polymers," with the named inventors Ram S. Narang and Timothy J. Fuller, the disclosure of which is totally incorporated herein by reference, discloses a composition which comprises a mixture of (A) a first component comprising a polymer, at least some of the monomer repeat units of which have at least one photosensitivity-imparting group thereon, said polymer having a first degree of photosensitivity-imparting group substitution measured in milliequivalents of photosensitivity-imparting group per gram and being of the general formula

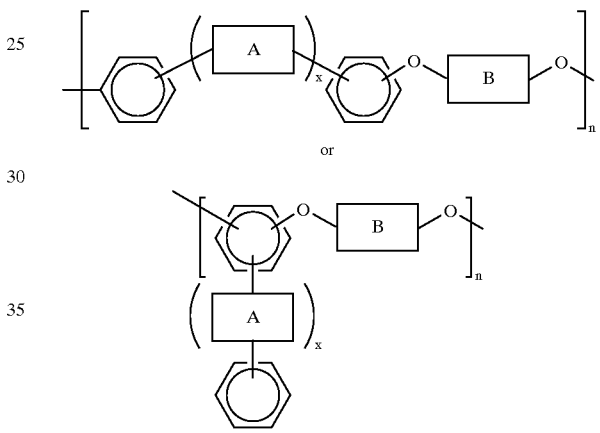

wherein x is an integer of 0 or 1, A is one of several specified groups, such as

B is one of several specified groups, such as

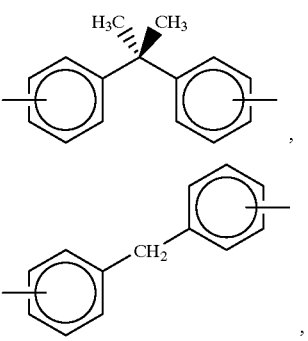

-continued

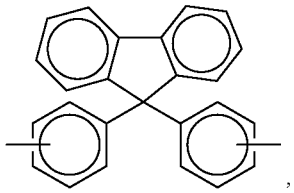

or mixtures thereof, and n is an integer representing the number of repeating monomer units, and (B) a second component which comprises either (1) a polymer having a second degree of photosensitivity-imparting group substitution measured in milliequivalents of photosensitivity-imparting group per gram lower than the first degree of photosensitivity-imparting group substitution, wherein said second degree of photosensitivity-imparting group substitution may be zero, wherein the mixture of the first component and the second component has a third degree of photosensitivity-imparting group substitution measured in milliequivalents of photosensitivity-imparting group per gram which is lower than the first degree of photosensitivity-imparting group substitution and higher than the second degree of photosensitivity-imparting group substitution, or (2) a reactive diluent having at least one photosensitivity-imparting group per molecule and having a fourth degree of photosensitivity-imparting group substitution measured in milliequivalents of photosensitivity-imparting group per gram, wherein the mixture of the first component and the second component has a fifth degree of photosensitivity-imparting group substitution measured in milliequivalents of photosensitivity-imparting group per gram which is higher than the first degree of photosensitivity-imparting group substitution and lower than the fourth degree of photosensitivity-imparting group substitution; wherein the weight average molecular weight of the mixture is from about 10,000 to about 50,000; and wherein the third or fifth degree of photosensitivity-imparting group substitution is from about 0.25 to about 2 milliequivalents of photosensitivity-imparting groups per gram of mixture. Also disclosed is a process for preparing a thermal ink jet printhead with the aforementioned composition.

Copending application U.S. Ser. No. 08/705,372, filed Aug. 29, 1996, filed concurrently herewith, entitled "High Performance Curable Polymers and Processes for the Preparation Thereof," with the named inventors Ram S. Narang and Timothy J. Fuller, the disclosure of which is totally incorporated herein by reference, discloses a composition which comprises a polymer containing at least some monomer repeat units with photosensitivity-imparting substituents which enable crosslinking or chain extension of the polymer upon exposure to actinic radiation, said polymer being of the formula

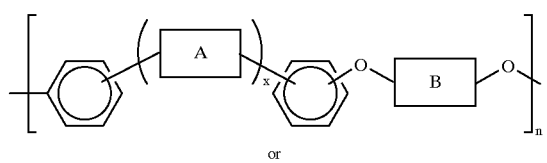

or

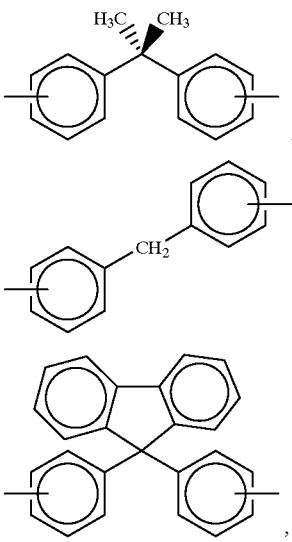

wherein x is an integer of 0 or 1, A is one of several specified groups, such as

B is one of several specified groups, such as or mixtures thereof, and n is an integer representing the number of repeating monomer units, wherein said photosensitivity-imparting substituents are allyl ether groups, epoxy groups, or mixtures thereof. Also disclosed are a process for preparing a thermal ink jet printhead containing the aforementioned polymers and processes for preparing the aforementioned polymers.

Copending application U.S. Ser. No. 08/705,490, filed Aug. 29, 1996 now U.S. Pat. No. 5,863,963, filed concurrently herewith, entitled "Halomethylated High Performance Curable Polymers," with the named inventors Ram S. Narang and Timothy J. Fuller, the disclosure of which is totally incorporated herein by reference, discloses a process which comprises the steps of (a) providing a polymer containing at least some monomer repeat units with halomethyl group substituents which enable crosslinking or chain extension of the polymer upon exposure to a radiation source which is electron beam radiation, x-ray radiation, or deep ultraviolet radiation, said polymer being of the formula

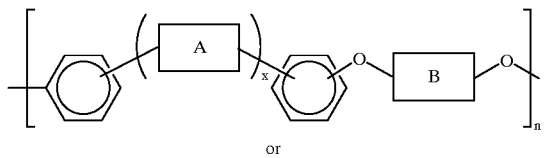

or

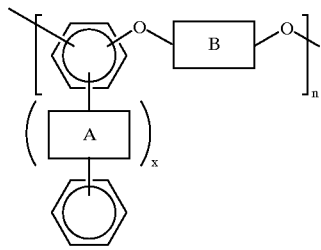

wherein x is an integer of 0 or 1, A is one of several specified groups, such as

B is one of several specified groups, such as

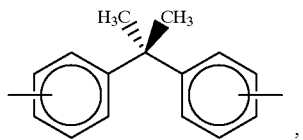

,

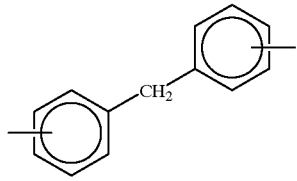

,

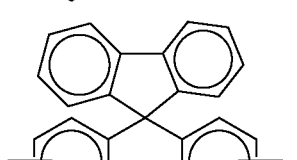

, or mixtures thereof, and n is an integer representing the number of repeating monomer units, and (b) causing the polymer to become crosslinked or chain extended through the photosensitivity-imparting groups. Also disclosed is a process for preparing a thermal ink jet printhead by the aforementioned curing process.

Copending application U.S. Ser. No. 08/697,760, filed Aug. 29, 1996, filed concurrently herewith, entitled "Aqueous Developable High Performance Curable Polymers," with the named inventors Ram S. Narang and Timothy J. Fuller, the disclosure of which is totally incorporated herein by reference, discloses a composition which comprises a polymer containing at least some monomer repeat units with water-solubility-imparting substituents and at least some monomer repeat units with photosensitivity-imparting substituents which enable crosslinking or chain extension of the polymer upon exposure to actinic radiation, said polymer being of the formula

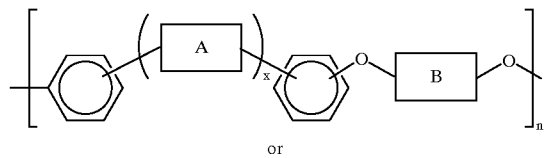

or

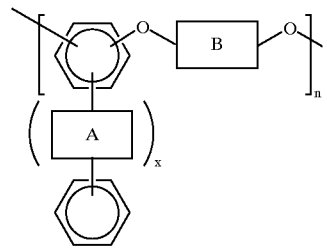

wherein x is an integer of 0 or 1, A is one of several specified groups, such as

B is one of several specified groups, such as

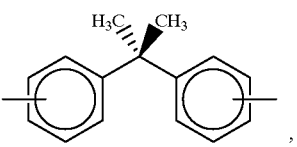

,

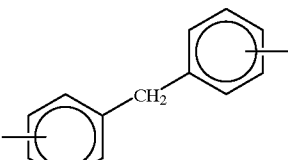

,

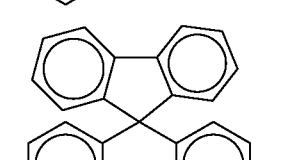

, or mixtures thereof, and n is an integer representing the number of repeating monomer units. In one embodiment, a single functional group imparts both photosensitivity and water solubility to the polymer. In another embodiment, a first functional group imparts photosensitivity to the polymer and a second functional group imparts water solubility to the polymer. Also disclosed is a process for preparing a thermal ink jet printhead with the aforementioned polymers.

Substrates for mounting semiconductor chips preferably have desirable thermal conductivity characteristics, desirable thermal expansion characteristics, and desirable surface characteristic, are easily machined, and also have desirable aesthetic characteristics. For example, in a thermal ink jet printhead substrate, which preferably functions as a heat sink, it is important to have good thermal conductivity as well as the ability to form required features in the substrate at low cost. For a page width buttable printhead array, it is also important that the thermal expansion of the substrate have a good match to that of the silicon printhead die. If the substrate coefficient of thermal expansion differs too much from that of the silicon die, such as would occur if the substrate were made of aluminum, adjacent dies would push each other apart during die bond curing. Graphite is one suitable material for such substrates, and has an additional advantage in that it is readily machinable. Other examples include sintered metals, such as sintered bronze, sintered stainless steel, and the like. One disadvantage of porous materials such as graphite as the material for a printhead substrate, however, is its porosity. For example, silver-filled epoxies are sometimes used to bond the components of the printhead to the substrate because of the desirable thermal conductivity of such epoxies. When a silver-filled epoxy is used to bond the printhead components or subunits to the substrate, the resin may tend to wick into the porous substrate, leaving a silver-rich, adhesive-poor medium for adhering to the subunits. Further, on the front face of the printhead, ink can be absorbed by a porous material, thereby possibly swelling the adhesive bonds. In printing processes entailing printing with more than one color, the absorbed ink on the front face can also contaminate inks of other colors. Graphite also tends to shed particulates. In some page width buttable printhead arrays, fluid passageways in the substrate allow cooling fluid to maintain the bar temperature constant to minimize variations in spot size. When the cooling fluid is directly in contact with the graphite, over time some of the fluid may evaporate through the porous graphite. In addition, the cooling fluid can become loaded with graphite particles. Shedding of graphite particles onto the hand while handling the substrate is a further disadvantage. The shed particles can also contaminate the ink and the printing substrate (i.e., paper, transparency material, or the like).

Thus, while known compositions and processes are suitable for their intended purposes, a need remains for improved substrates for mounting semiconductor chips. There is also a need for improved heat sinking substrates for thermal ink jet printheads. A need also remains for improved thermal ink jet printhead arrays. In addition, a need remains for thermal ink jet printheads and printhead arrays having substrates with desirable thermal expansion characteristics. Further, there is a need for thermal ink jet printheads and printhead arrays having substrates with both desirable thermal expansion characteristics and desirable porosity characteristics. Additionally, there is a need for thermal ink jet printheads and printhead arrays having substrates with both desirable thermal expansion characteristics and reduced or eliminated shedding of particulates. There is also a need for thermal ink jet printheads and printhead arrays with aesthetically pleasing substrates.

SUMMARY OF THE INVENTION

It is an object of the present invention to provide substrates for mounting semiconductor chips with the above noted advantages.

It is another object of the present invention to provide improved heat sinking substrates for thermal ink jet printheads.

It is yet another object of the present invention to provide improved thermal ink jet printheads and printhead arrays with the above noted advantages.

It is still another object of the present invention to provide thermal ink jet printheads and printhead arrays having substrates with desirable thermal expansion characteristics.

Another object of the present invention is to provide thermal ink jet printheads and printhead arrays having substrates with both desirable thermal expansion characteristics and desirable porosity characteristics.

Yet another object of the present invention is to provide thermal ink jet printheads and printhead arrays having substrates with both desirable thermal expansion characteristics and reduced or eliminated shedding of particulates.

Another object of the present invention is to provide thermal ink jet printheads and printhead arrays with aesthetically pleasing substrates.

These and other objects of the present invention (or specific embodiments thereof) can be achieved by providing an apparatus which comprises at least one semiconductor chip mounted on a substrate, said substrate comprising a porous, electrically conductive member having electrophoretically deposited thereon a coating of a polymeric material. Another embodiment of the present invention is directed to a process for preparing a substrate having at least one semiconductor chip mounted thereon, said process comprising: (a) providing a porous, electrically conductive substrate; (b) preparing an electrocoating bath containing charged micelles of an organic material; (c) placing the substrate and a second electrode in contact with the electrocoating bath; (d) applying an electrical field between the substrate and the second electrode, thereby electrophoretically depositing a polymeric coating of the organic material on the substrate; and (e) permanently mounting at least one semiconductor chip on the coated substrate. Yet another embodiment of the present invention is directed to a thermal ink jet printer for ejecting a recording liquid onto a recording medium, said printer comprising a printhead which comprises at least a channel for holding the recording liquid, at least one nozzle for ejecting the recording liquid onto the recording medium, and a heating element situated so as to enable selective heating of the ink in the channel, thereby causing ink in the channel to be ejected from the nozzle, said printhead being permanently mounted on a porous, electrically conductive substrate, said substrate having electrophoretically deposited thereon a coating of a polymeric material.

BRIEF DESCRIPTION OF THE DRAWINGS

FIG. 6 is a front view of a typical pagewidth printhead formed by staggered sideshooter printhead subunits on two separate structural bars.

FIG. 7 is a front view of a typical pagewidth printhead formed by sideshooter printhead subunits in a staggered array on opposite sides of a single structural bar.

DETAILED DESCRIPTION OF THE INVENTION

Figure 1:
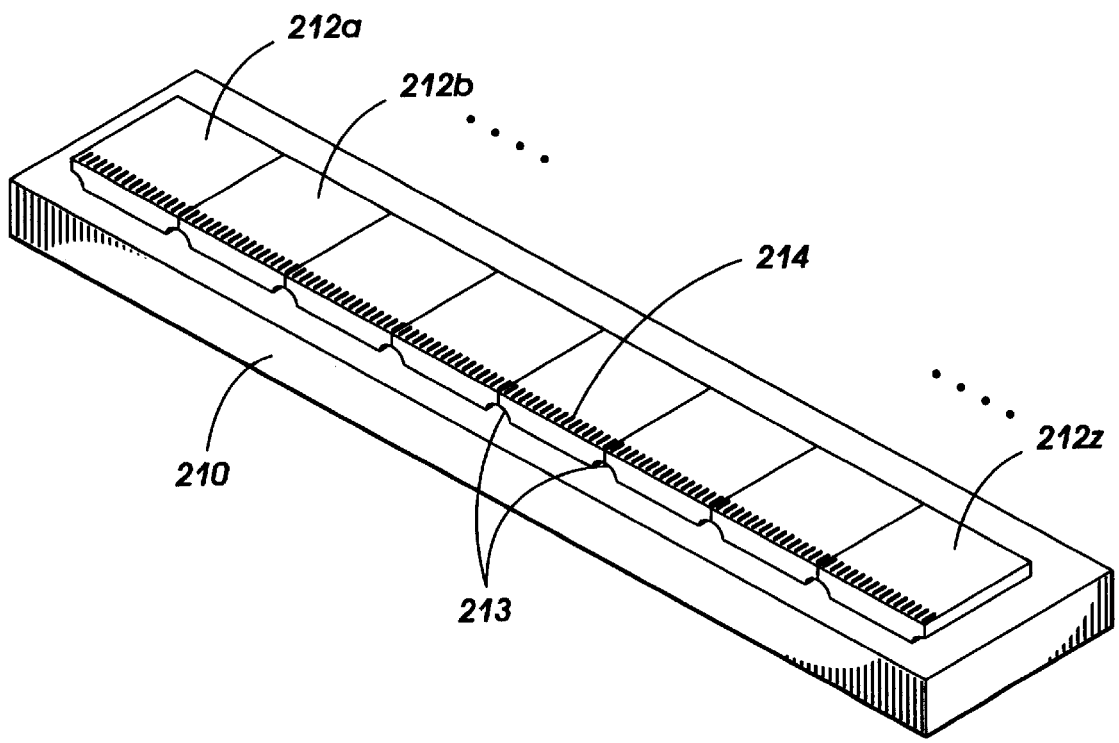
FIG. 1 is a simplified perspective view showing a base substrate having a plurality of butted semiconductor chips mounted thereon.

FIG. 1 illustrates a base substrate 210 of a porous, electrically conductive material such as graphite, a sintered metal such as sintered bronze or sintered stainless steel, or the like, having electrophoretically deposited thereon a polymeric material, said substrate having a plurality of butted silicon chips 212a, 212b, . . . 212z mounted thereon. Although the chips 212a–212z shown in FIG. 1 are not specified as to function, it will be understood that they each may represent a portion of a CCD, another type of photosensitive semiconductor chip, an LED (light-emitting diode) print bar, a chip relating to thermal ink-jet technology, or any other purpose in which a series of semiconductor chips are required to be arranged in butted fashion. At the side interfaces between adjacent chips 212 on the substrate 210, are preferably formed back-cuts 213. Back-cuts 213 are open-ended grooves having the open ends thereof disposed adjacent the surface of substrate 212, and serve to provide narrow cavities between the adjacent chips and the substrate 210. Such back-cuts are shown, for example, in U.S. Pat. No. 4,814,296. In one typical application of butted chips on a substrate, the chips 212a–212z are of a thickness of approximately 17 mils, with back-cuts at the edges thereof so that the thickness of each chip in the area of a back-cut is about 6 mils. The cavities formed by back-cuts 213 are useful, among other reasons, for receiving excess quantities of epoxy placed on the substrate 210 and pressed out from under the chips in the array assembly process.

Also defined on each chip 212a, 212b, . . . 212z is a set of repetitive structures 214. The repetitive structures are any regularly-spaced devices or structures on each chip which form a regular pattern. These structures may be, by way of example and not limitation, photosites in a CCD, LEDs, or capillary channels or resistors in portions of thermal ink-jet printheads.

Figure 2:
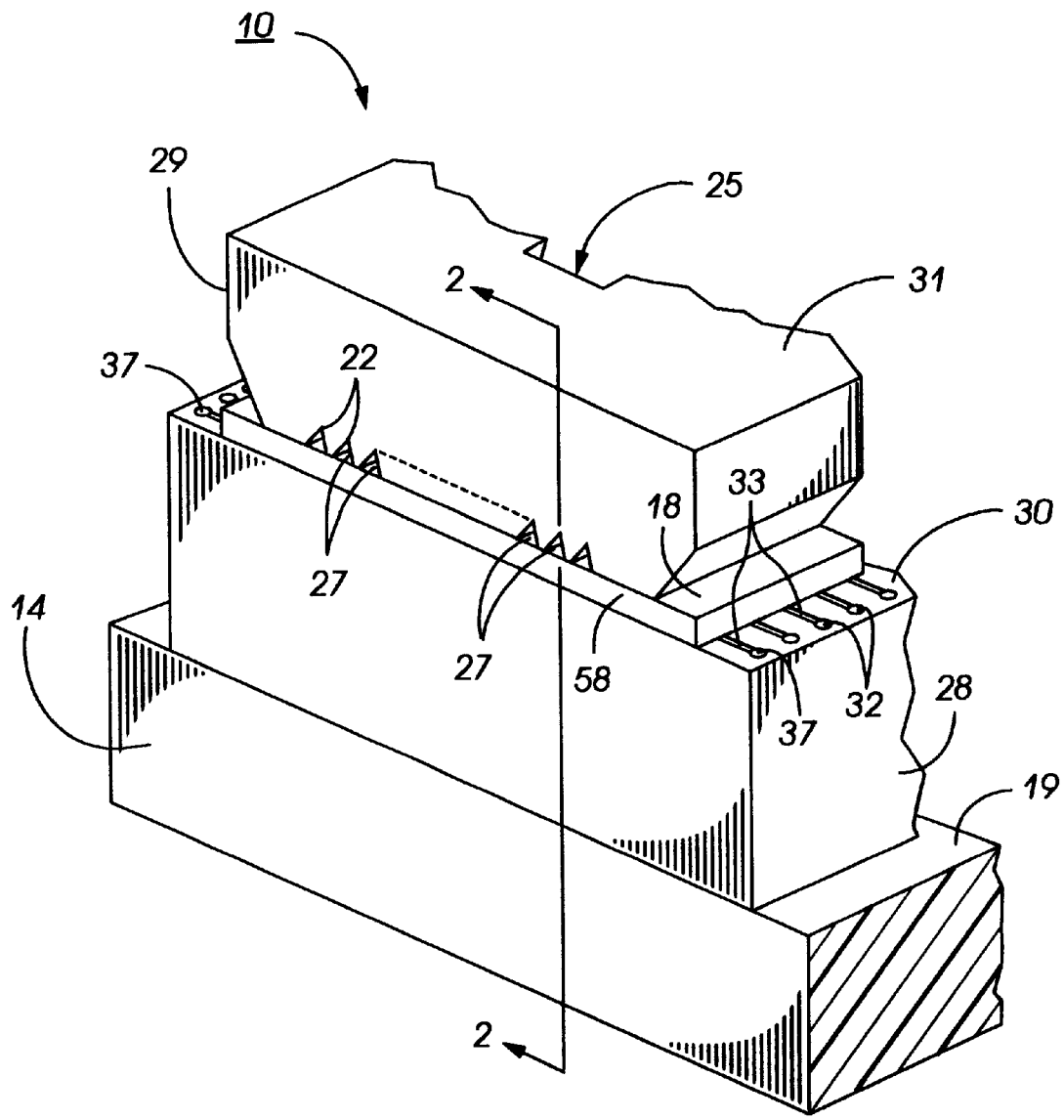
FIG. 2 is an enlarged schematic isometric view of an example of a sideshooter printhead mounted on a daughter board showing the droplet emitting nozzles.
Figure 3:
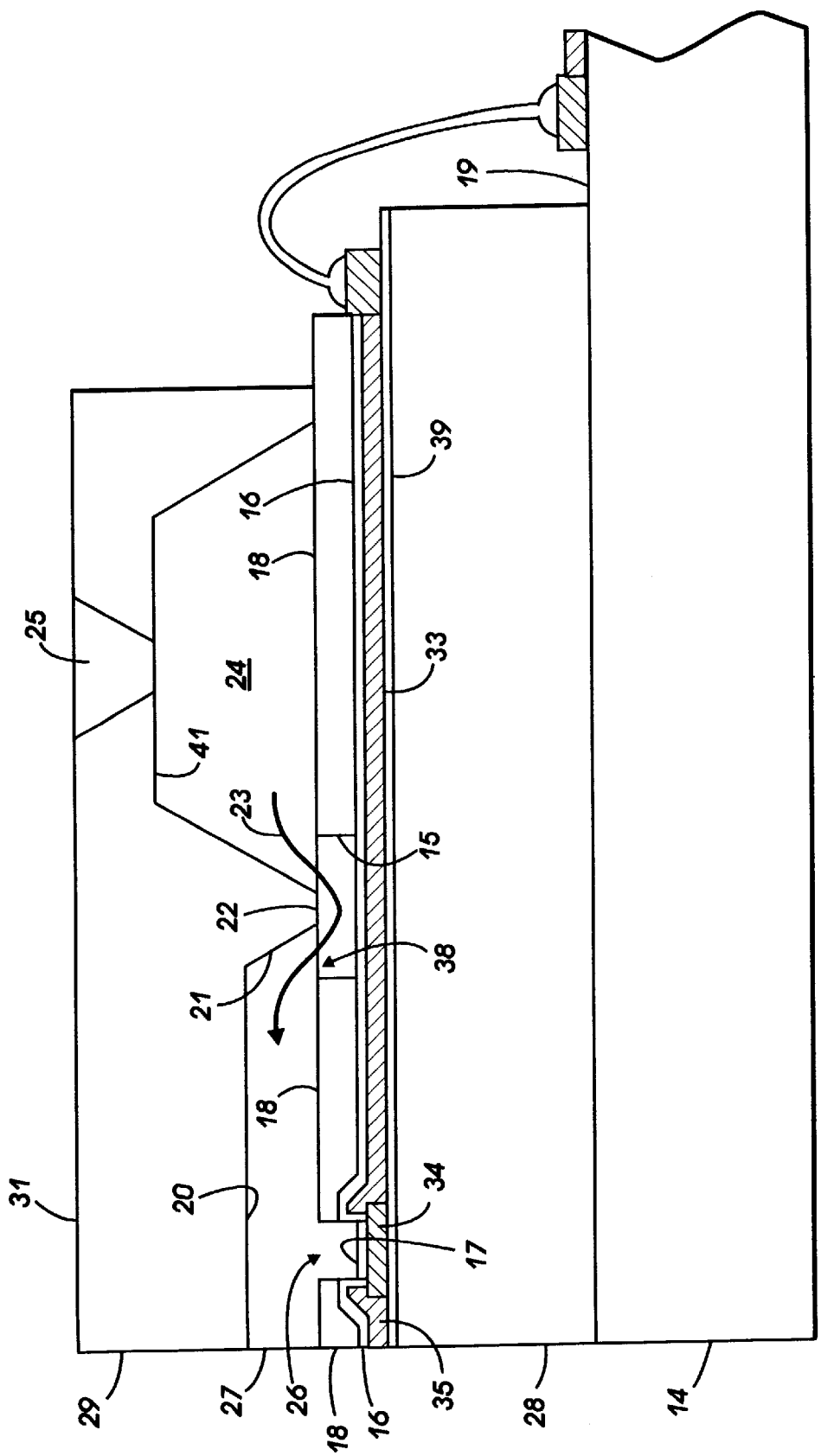
FIG. 3 is an enlarged cross-sectional view of FIG. 2 as viewed along the line 2—2 thereof and showing the electrode passivation and ink flow path between the manifold and the ink channels.

Thermal ink jet printheads of the present invention can be of any suitable configuration. An example of a suitable configuration is illustrated schematically in FIG. 2, which depicts an enlarged, schematic isometric view of the front face 29 of a printhead 10 showing the array of droplet emitting nozzles 27. Referring also to FIG. 3, discussed later, the lower electrically insulating substrate or heating element plate 28 has the heating elements 34 and addressing electrodes 33 patterned on surface 30 thereof, while the upper substrate or channel plate 31 has parallel grooves 20 which extend in one direction and penetrate through the upper substrate front face edge 29. The other end of grooves 20 terminate at slanted wall 21, the floor 41 of the internal recess 24 which is used as the ink supply manifold for the capillary filled ink channels 20, has an opening 25 therethrough for use as an ink fill hole. The surface of the channel plate with the grooves are aligned and bonded to the heater plate 28, so that a respective one of the plurality of heating elements 34 is positioned in each channel, formed by the grooves and the lower substrate or heater plate. Ink enters the manifold formed by the recess 24 and the lower substrate 28 through the fill hole 25 and by capillary action, fills the channels 20 by flowing through an elongated recess 38 formed in the thick film insulative layer 18. The ink at each nozzle forms a meniscus, the surface tension of which prevents the ink from weeping therefrom. The addressing electrodes 33 on the lower substrate or channel plate 28 terminate at terminals 32. Although electrodes 32 may, in some embodiments, be situated along the sides of the thermal ink jet chip as shown in FIG. 2, to form the butted configuration of FIG. 1 the electrodes 32 must be restricted to the rear of the chip, as shown in FIG. 3. The upper substrate or channel plate 31 is smaller than that of the lower substrate in order that the electrode terminals 32 are exposed and available for wire bonding to the electrodes on the electrophoretically coated porous, electrically conductive substrate 14 (upon which is also mounted daughter board 19), on which or adjacent to which the printhead 10 is permanently mounted. Layer 18 is a thick film passivation layer, discussed later, sandwiched between the upper and lower substrates. This layer is etched to expose the heating elements, thus placing them in a pit, and is etched to form the elongated recess to enable ink flow between the manifold 24 and the ink channels 20. In addition, the thick film insulative layer is etched to expose the electrode terminals.

A cross sectional view of FIG. 2 is taken along view line 2—2 through one channel and shown as FIG. 3 to show how the ink flows from the manifold 24 and around the end 21 of the groove 20 as depicted by arrow 23. As is disclosed in U.S. Pat. No. 4,638,337, U.S. Pat. No. 4,601,777, and U.S. Pat. No. Re. 32,572, the disclosures of each of which are totally incorporated herein by reference, a plurality of sets of bubble generating heating elements 34 and their addressing electrodes 33 can be patterned on the polished surface of a single side polished (100) silicon wafer. Prior to patterning, the multiple sets of printhead electrodes 33, the resistive material that serves as the heating elements 34, and the common return 35, the polished surface of the wafer is coated with an underglaze layer 39 such as silicon dioxide, having a typical thickness of from about 5,000 Angstroms to about 2 microns, although the thickness can be outside this range. The resistive material can be a doped polycrystalline silicon, which can be deposited by chemical vapor deposition (CVD) or any other well known resistive material such as zirconium boride ($ZrB_2$). The common return and the addressing electrodes are typically aluminum leads deposited on the underglaze and over the edges of the heating elements. The common return ends or terminals 37 and addressing electrode terminals 32 are positioned at predetermined locations to allow clearance for wire bonding to the electrodes (not shown) of the daughter board 19, after the channel plate 31 is attached to make a printhead. The common return 35 and the addressing electrodes 33 are deposited to a thickness typically of from about 0.5 to about 3 microns, although the thickness can be outside this range, with the preferred thickness being 1.5 microns.

If polysilicon heating elements are used, they may be subsequently oxidized in steam or oxygen at a relatively high temperature, typically about 1,100° C. although the temperature can be above or below this value, for a period of time typically of from about 50 to about 80 minutes, although the time period can be outside this range, prior to the deposition of the aluminum leads, in order to convert a small portion of the polysilicon to $SiO_2$. In such cases, the heating elements are thermally oxidized to achieve an overglaze (not shown) of $SiO_2$ with a thickness typically of from about 500 Angstroms to about 1 micron, although the thickness can be outside this range, which has good integrity with substantially no pinholes.

In one embodiment, polysilicon heating elements are used and an optional silicon dioxide thermal oxide layer 17 is grown from the polysilicon in high temperature steam. The thermal oxide layer is typically grown to a thickness of from about 0.5 to about 1 micron, although the thickness can be outside this range, to protect and insulate the heating elements from the conductive ink. The thermal oxide is removed at the edges of the polysilicon heating elements for attachment of the addressing electrodes and common return, which are then patterned and deposited. If a resistive material such as zirconium boride is used for the heating elements, then other suitable well known insulative materials can be used for the protective layer thereover. Before electrode passivation, a tantalum (Ta) layer (not shown) can be optionally deposited, typically to a thickness of about 1 micron, although the thickness can be above or below this value, on the heating element protective layer 17 for added protection thereof against the cavitational forces generated by the collapsing ink vapor bubbles during printhead operation. The tantalum layer is etched off all but the protective layer 17 directly over the heating elements using, for example, $CF_4/O_2$ plasma etching. For polysilicon heating elements, the aluminum common return and addressing electrodes typically are deposited on the underglaze layer and over the opposing edges of the polysilicon heating elements which have been cleared of oxide for the attachment of the common return and electrodes.

For electrode passivation, a film 16 is deposited over the entire wafer surface but is patterned to remove it from the heating elements and wire bond pads. The passivation film 16 provides an ion barrier which will protect the exposed electrodes from the ink. Examples of suitable ion barrier materials for passivation film 16 include polyimide, plasma nitride, phosphorous doped silicon dioxide, polyarylene ether ketones and their derivatives, materials disclosed hereinafter as being suitable for insulative layer 18, and the like, as well as any combinations thereof. An effective ion barrier layer is generally achieved when its thickness is from about 1000 Angstroms to about 10 microns, although the thickness can be outside this range. In 300 dpi printheads, passivation layer 16 preferably has a thickness of about 3 microns, although the thickness can be above or below this value. In 600 dpi printheads, the thickness of possivation layer 16 preferably is such that the combined thickness of layer 16 and layer 18 is about 25 microns, although the thickness can be above or below this value. The passivation film or layer 16 is etched off of the terminal ends of the common return and addressing electrodes for wire bonding later with the daughter board electrodes. This etching of the silicon dioxide film can be by either the wet or dry etching method. Alternatively, the electrode passivation can be by plasma deposited silicon nitride ($Si_3N_4$).

Next, a thick film type insulative layer 18, of a photopatternable material such as Riston®, Vacrel®, Probimer®, polyimide, photoactive polyarylene ether ketones, or the like, is formed on the passivation layer 16, typically having a thickness of from about 10 to about 100 microns and preferably in the range of from about 15 to about 50 microns, although the thickness can be outside these ranges. Even more preferably, in 300 dpi printheads, layer 18 preferably has a thickness of about 30 microns, and in 600 dpi printheads, layer 18 preferably has a thickness of from about 15 to about 25 microns, although other thicknesses can be employed. The insulative layer 18 is photolithographically processed to enable etching and removal of those portions of the layer 18 over each heating element (forming recesses 26), the elongated recess 38 for providing ink passage from the manifold 24 to the ink channels 20, and over each electrode terminal 32, 37. The elongated recess 38 is formed by the removal of this portion of the thick film layer 18. Thus, the passivation layer 16 alone protects the electrodes 33 from exposure to the ink in this elongated recess 38.

Figure 4:
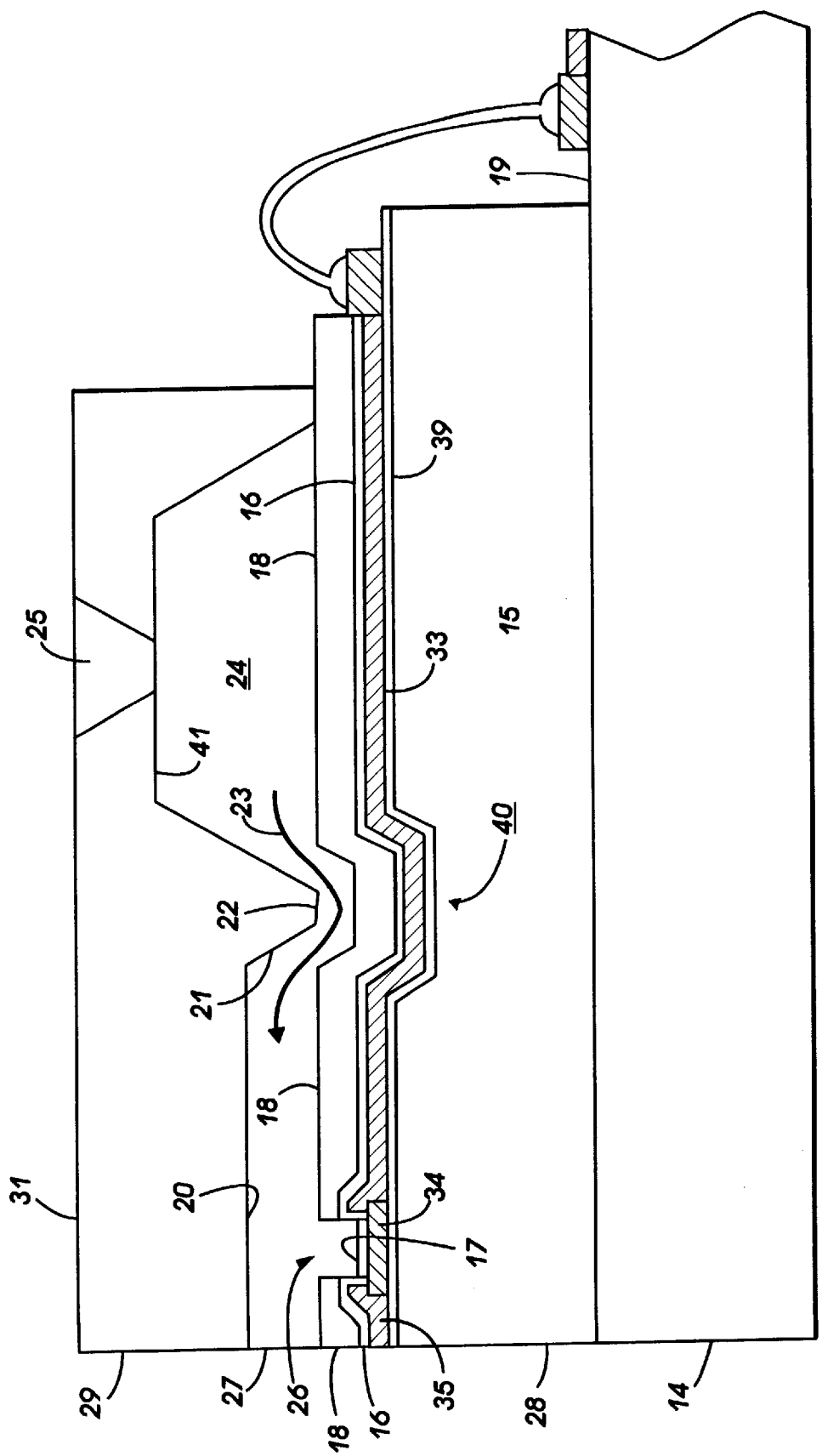
FIG. 4 is an enlarged cross-sectional view of an alternate embodiment of the sideshooter printhead in FIG. 2 as viewed along the line 2—2 thereof.

FIG. 4 is a similar view to that of FIG. 3 with a shallow anisotropically etched groove 40 in the heater plate, which is silicon, prior to formation of the underglaze 39 and patterning of the heating elements 34, electrodes 33 and common return 35. This recess 40 permits the use of only the thick film insulative layer 18 and eliminates the need for the usual electrode passivating layer 16. Since the thick film layer 18 is impervious to water and relatively thick (typically from about 20 to about 40 microns, although the thickness can be outside this range), contamination introduced into the circuitry will be much less than with only the relatively thin passivation layer 16 well known in the art. The heater plate is a fairly hostile environment for integrated circuits. Commercial ink generally entails a low attention to purity. As a result, the active part of the heater plate will be at elevated temperature adjacent to a contaminated aqueous ink solution which undoubtedly abounds with mobile ions. In addition, it is generally desirable to run the heater plate at a voltage of from about 30 to about 50 volts, so that there will be a substantial field present. Thus, the thick film insulative layer 18 provides improved protection for the active devices and provides improved protection, resulting in longer operating lifetime for the heater plate.

When a plurality of lower substrates 28 are produced from a single silicon wafer, at a convenient point after the underglaze is deposited, at least two alignment markings (not shown) preferably are photolithographically produced at predetermined locations on the lower substrates 28 which make up the silicon wafer. These alignment markings are used for alignment of the plurality of upper substrates 31 containing the ink channels. The surface of the single sided wafer containing the plurality of sets of heating elements is bonded to the surface of the wafer containing the plurality of ink channel containing upper substrates subsequent to alignment.

As disclosed in U.S. Pat. No. 4,601,777 and U.S. Pat. No. 4,638,337, the disclosures of each of which are totally incorporated herein by reference, the channel plate is formed from a two side polished, (100) silicon wafer to produce a plurality of upper substrates 31 for the printhead. After the wafer is chemically cleaned, a pyrolytic CVD silicon nitride layer (not shown) is deposited on both sides. Using conventional photolithography, a via for fill hole 25 for each of the plurality of channel plates 31 and at least two vias for alignment openings (not shown) at predetermined locations are printed on one wafer side. The silicon nitride is plasma etched off of the patterned vias representing the fill holes and alignment openings. A potassium hydroxide (KOH) anisotropic etch can be used to etch the fill holes and alignment openings. In this case, the (111) planes of the (100) wafer typically make an angle of about 54.7 degrees with the surface of the wafer. The fill holes are small square surface patterns, generally of about 20 mils (500 microns) per side, although the dimensions can be above or below this value, and the alignment openings are from about 60 to about 80 mils (1.5 to 3 millimeters) square, although the dimensions can be outside this range. Thus, the alignment openings are etched entirely through the 20 mil (0.5 millimeter) thick wafer, while the fill holes are etched to a terminating apex at about halfway through to three-quarters through the wafer.

The relatively small square fill hole is invariant to further size increase with continued etching so that the etching of the alignment openings and fill holes are not significantly time constrained.

Next, the opposite side of the wafer is photolithographically patterned and etched, using the previously etched alignment holes as a reference to form the relatively large rectangular recesses 24 and sets of elongated, parallel channel recesses that will eventually become the ink manifolds and channels of the printheads.

The surface 22 of the wafer containing the manifold and channel recesses are portions of the original wafer surface (covered by a silicon nitride layer) on which an adhesive, such as a thermosetting epoxy, will be applied later for bonding it to the substrate containing the plurality of sets of heating elements. The adhesive is applied in a manner such that it does not run or spread into the grooves or other recesses. The alignment markings can be used with, for example, a vacuum chuck mask aligner to align the channel wafer on the heating element and addressing electrode wafer. The two wafers are accurately mated and can be tacked together using a fast curing (for example, an ultraviolet curing) adhesive. Alternatively, the heating element and channel wafers can be given precisely diced edges and then manually or automatically aligned in a precision jig. Alignment can also be performed with an infrared aligner-bonder, with an infrared microscope using infrared opaque markings on each wafer to be aligned, or the like. The two wafers can then be cured in an oven or laminator to bond them together permanently. The bonded wafer pair can then be diced to produce individual die modules. A final dicing cut, which produces end face 29, opens one end of the elongated groove 20 producing nozzles 27. The other ends of the channel groove 20 remain closed by end 21. However, the alignment and bonding of the channel plate to the heater plate places the ends 21 of channels 20 directly over elongated recess 38 in the thick film insulative layer 18 as shown in FIG. 3 or directly above the recess 40 as shown in FIG. 4 enabling the flow of ink into the channels from the manifold as depicted by arrows 23. The plurality of individual printhead die modules produced by the final dicing are bonded to the electrophoretically coated porous, electrically conductive substrate and the printhead electrode terminals are wire bonded to the daughter board electrodes.

Figure 5:
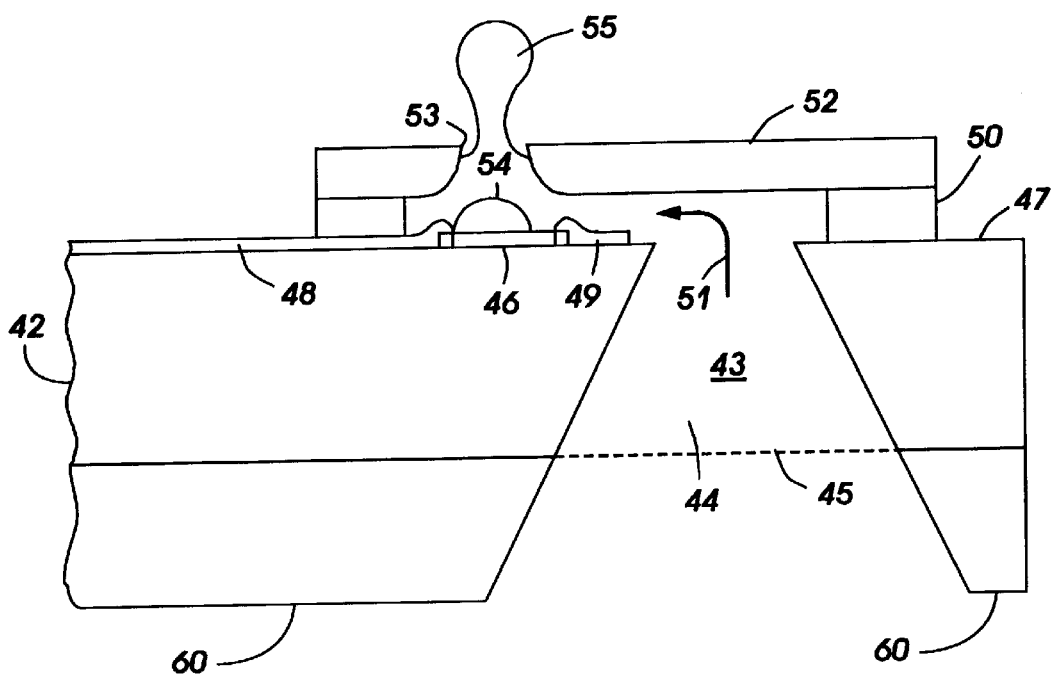
FIG. 5 is a schematic cross-sectional view of a typical roofshooter-type thermal ink jet printhead.

A typical roofshooter-type thermal ink jet printhead is shown in FIG. 5. As shown, heater plate 42 is mounted on electrophoretically coated porous, electrically conductive heat sinking substrate 60. In this configuration, the silicon heater plate 42 has a reservoir or feed slot 43 etched therethrough. The inlet 44 is covered by filter 45. An array of heating elements 46 are patterned on heater plate surface 47 near the open bottom of reservoir 43. The heating elements are selectively addressed via passivated addressing electrodes 48 and common return 49 (passivated layer not shown). A flow directing layer 50 is patterned to form flow paths for the ink from the reservoir to a location above the heating elements as shown by arrow 51. A nozzle plate 52 containing nozzles 53 is aligned and bonded to flow directing layer 50 so that the nozzles are directly above the heating elements. An electrical signal applied to the heating element temporarily vaporizes the ink and forms droplet ejecting bubbles 54 which eject droplet 55 in a direction normal to the heating element.

FIG. 6 depicts one prior art embodiment of a pagewidth thermal ink jet printhead wherein the fully functional sideshooter printhead subunits are mounted on structural bars 138 in an equally spaced manner. Structural bars 138 are fabricated of electrophoretically coated graphite, sintered metal, or the like. The structural bars with sideshooter printheads 110 similar to those shown in FIG. 2 are fastened together by bar connectors 139 having mounting flanges 140. Optionally, if desired, bar connectors 139 and/or mounting flanges 140 can be fabricated of graphite or sintered metal, or electrophoretically coated graphite or sintered metal, to match coefficients of thermal expansion with structural bars 138. The printheads on each structural bar are supplied with ink from manifold 137 which has openings (not shown) aligned and sealed with the inlets of the printhead subunits. The bar connectors provide the appropriate spacing between bars to provide clearance for the ink manifolds as well as the printhead subunits. The structural bars and connectors are fixedly attached to each other by, for example, bolts 141. The printhead subunits on one of the structural bars are offset from the printhead subunits of the other structural bar to provide pagewidth coverage by the droplets ejected from the nozzles from all of the printhead subunits. To aid in the understanding of the orientation of the pagewidth printhead, the X, Y and Z coordinates are shown in FIG. 6, with the Z direction being the direction the droplets travel from the printhead nozzles to the recording medium. The X direction is in a plane parallel to the recording medium, and the Y direction indicates the direction of movement of the recording medium past the pagewidth printhead. Thus, in this view, the droplets would travel from the nozzles at the plane of the paper in a direction perpendicular therefrom towards the viewer. An alternate pagewidth printhead utilizing sideshooter printhead subunits is shown in FIG. 7, where a single structural bar 138 is used with mounting bar flanges 140 on either edge and with the sideshooter thermal ink jet printhead subunits mounted in a staggered fashion on opposite sides thereof. Structural bar 138 is fabricated of electrophoretically coated graphite, sintered metal, or the like. Optionally, if desired, mounting bar flanges 140 can be fabricated of graphite or sintered metal, or electrophoretically coated graphite or sintered metal, to match coefficients of thermal expansion with structural bar 138. The printhead subunits on each side of the bar have an ink manifold 137 with openings (not shown) aligned and sealed with the inlets of the printhead subunits to prevent ink leakage therefrom.

Figure 8:
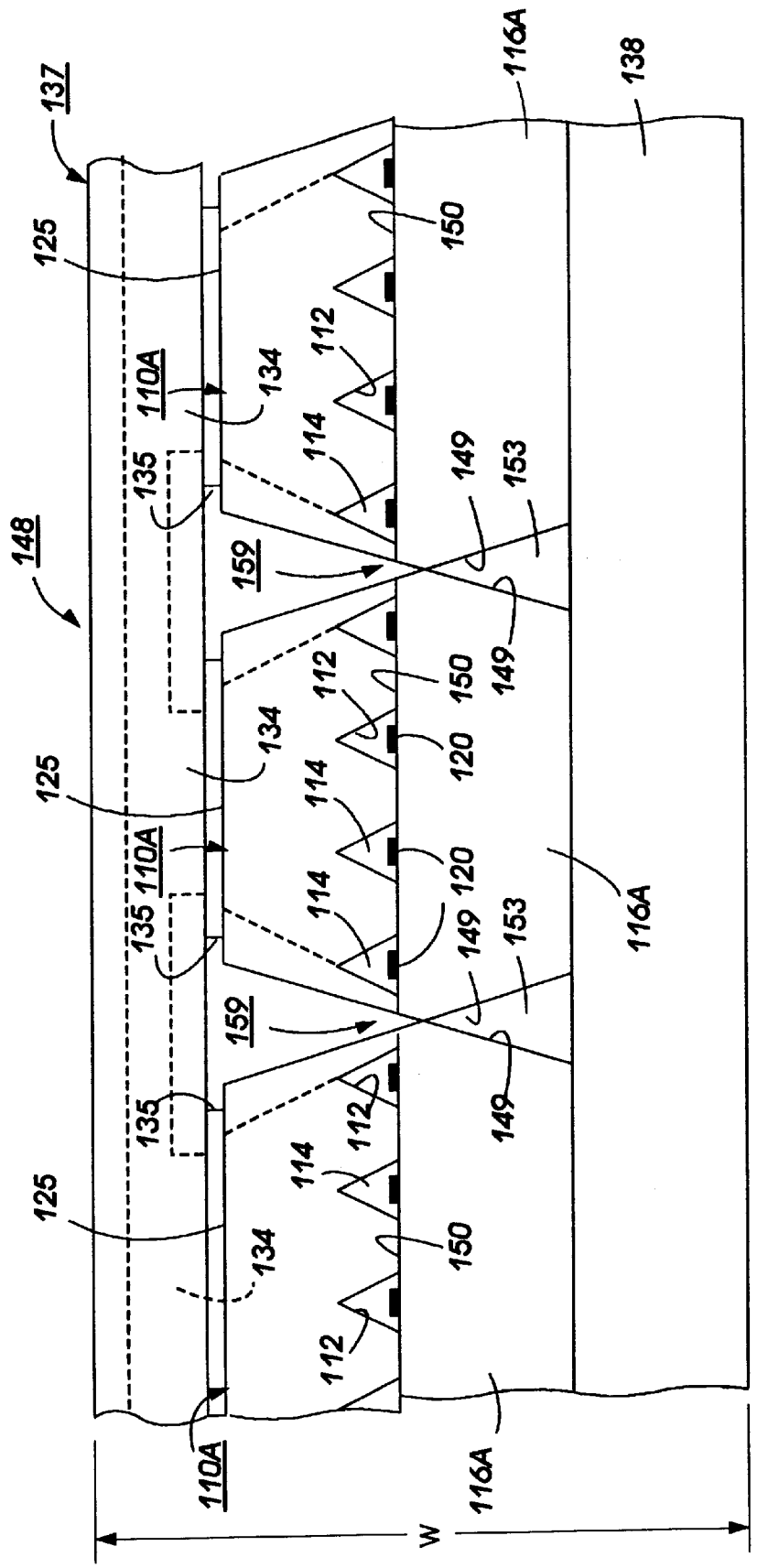
FIG. 8 is an enlarged partially shown front view of a typical pagewidth printhead formed from the abutment of smaller sideshooter printhead subunits produced by the abutment of the subunits on a single structural bar.

An alternate embodiment of a pagewidth printhead is shown in FIG. 8. In this configuration, an enlarged partially shown front elevation view of a pagewidth ink jet printhead 148 is shown of the type that is assembled from sideshooter printhead subunits 110A abutted end-to-end. The length is the width of a page or about 8.5 inches (21.6 cm) to 11 inches (28 cm) and the front face height W of the printhead and ink supplying manifold is about 0.50 to 1.0 inch or 1.25 to 2.5 cm. Schematically illustrated heating elements 120 are shown in each channel 112 through nozzles 114. In this pagewidth embodiment, a very small v-groove 159 is optionally anisotropically etched in the surface of the heater plate wafer parallel to and on opposing sides of each set of heating elements, so that the slightly slanted dicing used to produce slanted walls 149 does not cut through the surface 150 containing the heating elements and supporting electrodes and circuitry (not shown). This eliminates all microcracking because the dicing blade only cuts outside of the (111) plane of the small v-groove 159. The confronting walls 149 of the heater plate 116A are preferably done with a slightly slanted dicing blade to enable the close tolerance abutting of the printhead subunits 110A. The oppositely sloping walls 149 produce gaps 153 because the bottom surface of the heater plates 116A are smaller than the top surfaces 150 when the dicing cut is made by slanted dicing blades which are slanted in equal but opposite directions. To strengthen the pagewidth printhead 148, the gaps 153 between the heater plates 116A specifically generated by slanted kerfs that produce sloping or slanted walls 149 may be optionally filled (not shown) with a flowable epoxy or other suitable adhesive. The pagewidth printhead 148 may be further stabilized and strengthened by assembly of the printhead subunits 110A on a flat structural member 138. Flat structural member 138 is fabricated of electrophoretically coated graphite, sintered metal, or the like. Assembly of the pagewidth printhead 148 is complete when an elongated hollow manifold 137 having outlets 134, each aligned with inlets 125 of the printhead subunits 110A. Gaskets 135 are sealed to the manifold 137 by a suitable adhesive. The gasket sealingly surrounds the printhead subunit inlets and outlets of the manifold and prevents the ink supplied to the printhead subunits via the manifold from leaking at the interface therebetween. For a more detailed description of this pagewidth printhead, refer to U.S. Pat. No. 4,935,750 (Hawkins), the disclosure of which is totally incorporated herein by reference. The X, Y, Z coordinates are also shown for this figure; thus, the droplets are ejected from the plane of the sheet and in a direction normal thereto and in a direction towards the viewer.

Figure 9:
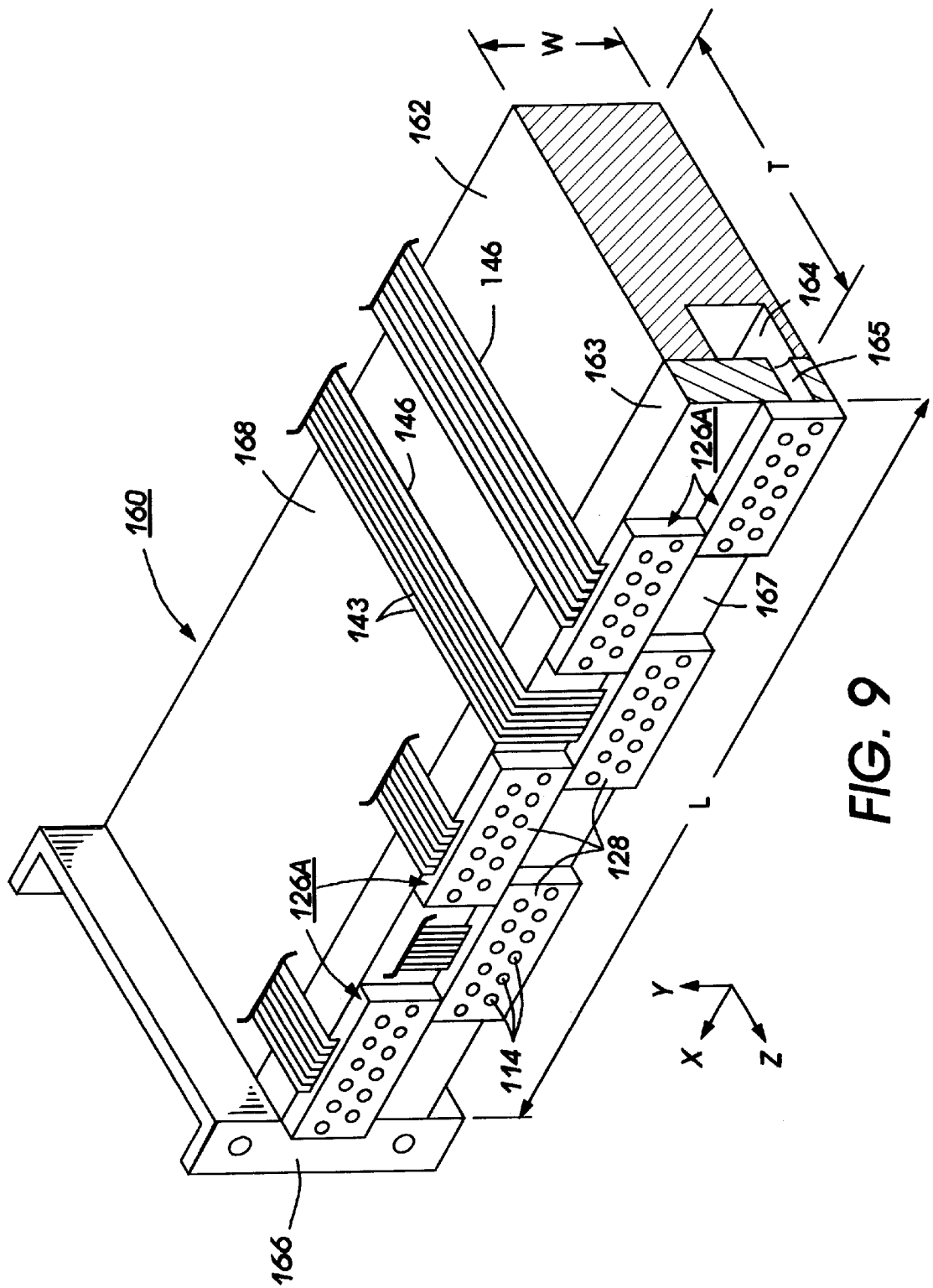
FIG. 9 is a partially shown isometric view of a pagewidth printhead formed by staggered roofshooter printhead subunits on a single structural bar.

Referring to FIG. 9, a pagewidth thermal ink jet printhead 160 is shown, using a roofshooter-type printhead subunits 126A. The printhead subunits, similar in construction to that depicted in FIG. 5, are mounted on edge 167 of structural bar 162 in two rows in an offset staggered manner. Each printhead subunit inlet is aligned with openings 165 in bar 162 which place the printhead subunit reservoirs into communication with ink supply passageway 164 formed in the bar adjacent the bar edge 167. Flexible cables 146 with signal lines 143 therein are mounted on surface 168 of the structural bar 162 and connected to the electrodes of the printhead subunits by means such as wire bonding (not shown). Mounting flanges 166 are attached to each end of the structural bar to provide means for mounting the pagewidth printhead in a printer. Each printhead subunit 126A contains two rows of nozzles offset from one another. For ease in providing a passageway for the ink, the structural bar comprises two parts. The main part has a groove 164 milled through one edge thereof and the other part is cover 163 which is bonded over the groove and which contains openings 165 therethrough. Cover 163 is fabricated of electrophoretically coated graphite, sintered metal, or the like, and functions as a heat sink. Optionally, if desired, structural bar 162 can also be fabricated of electrophoretically coated graphite, sintered metal, or the like. The length of the pagewidth bar is depicted by dimension L which is at least the distance across the width of the recording medium to be printed in the printer printing zone. The width of the structural bar is dimensioned to accommodate two printhead subunits and is depicted by the dimension W. A thickness or depth of the bar is shown as dimension T. An external ink supply (not shown) is located in a spaced location from the pagewidth printhead and provides ink to the passageway 164 in the structural bar by hoses (not shown). Ends of the hose are sealingly attached to the passageway 164 by well known coupling means.

Figure 10:
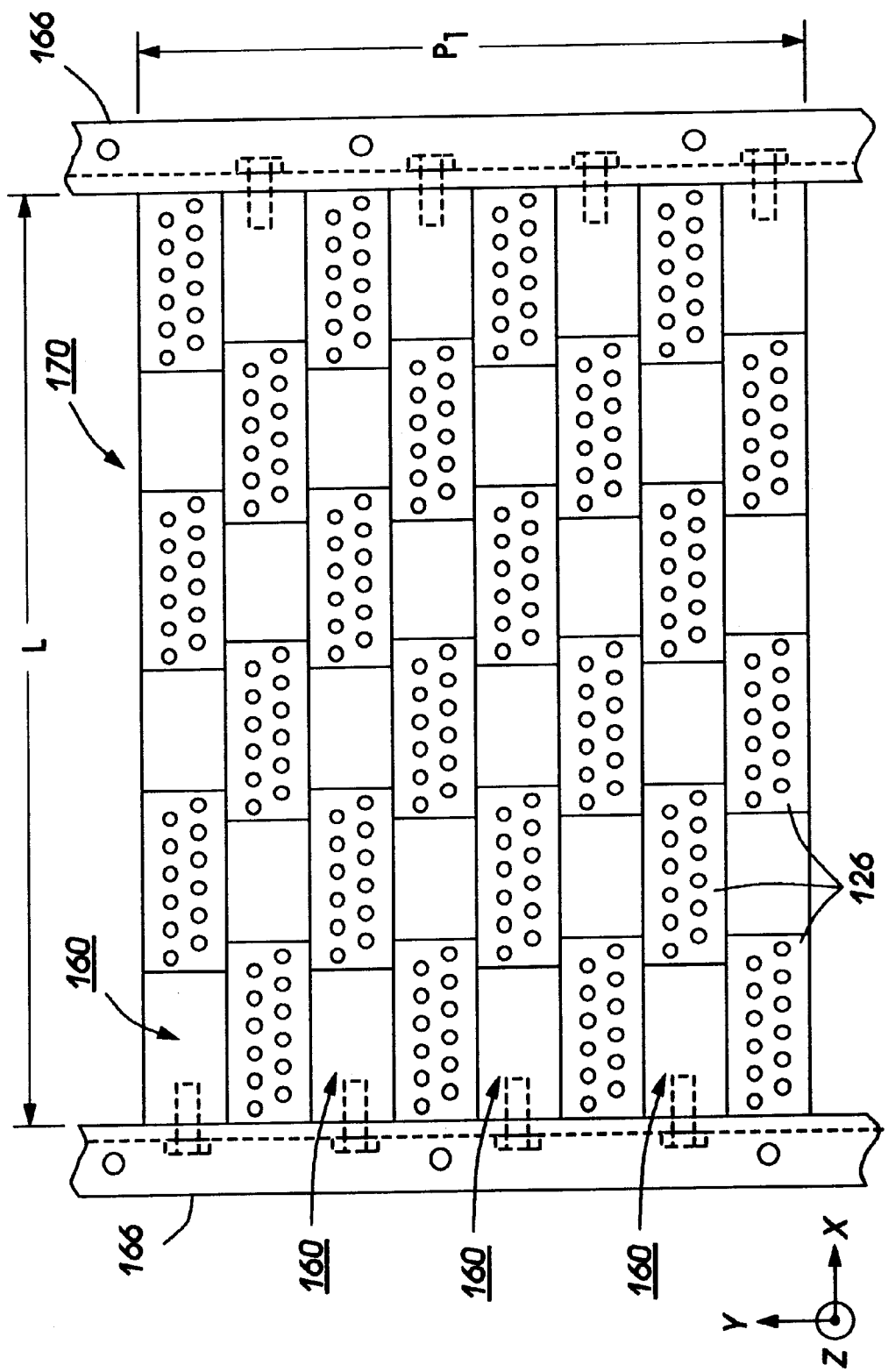
FIG. 10 is a front view of a multi-color pagewidth thermal ink jet printhead constructed from a plurality of the printheads shown in FIG. 9.
Figure 11:
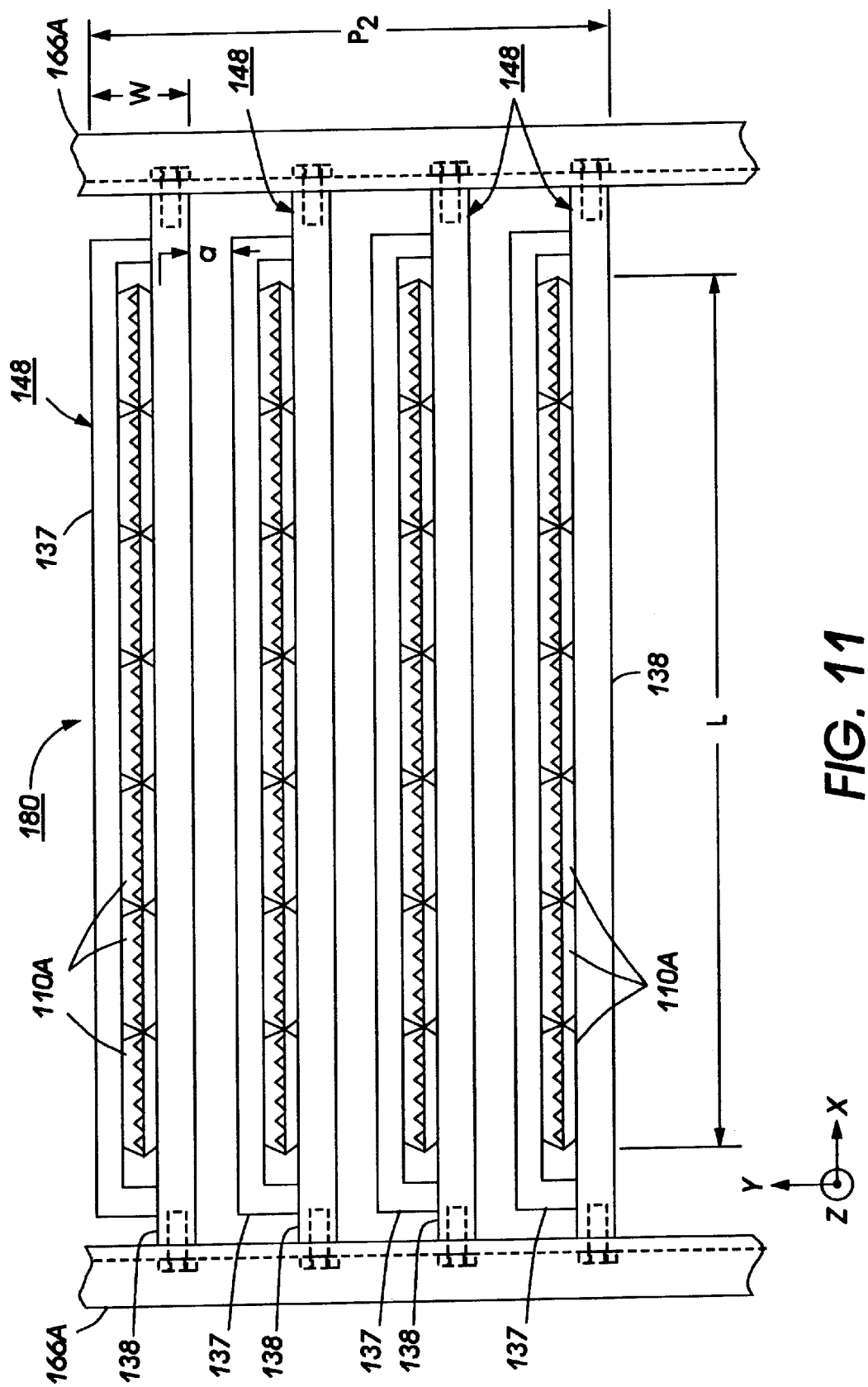
FIG. 11 is a front view of a multi-color pagewidth printhead formed from a plurality of pagewidth printheads shown in FIG. 8.

In multi-color ink jet printing systems, several pagewidth printheads are generally used, one for each color. Generally, four printheads are used, one for black and one each for magenta, yellow and cyan. To prevent the ink from wicking into the recording medium, usually paper, it is important to minimize the area of the printing zone so that the ink can be dried quickly. A front view of a multi-colored thermal ink jet printhead is shown in FIG. 10 utilizing the roofshooter-type pagewidth printheads shown in FIG. 9. Because the printhead subunits are bonded to the edge of the structural bar facing the Z direction, the pagewidth printheads may be stacked one on top of the other spaced only by the flexible electrodes, which have a thickness of about 0.1 to 0.2 cm, thus presenting a printing area defined by the length of the pagewidth printhead and the distance defined by the thickness of four structural bars shown in FIG. 10 as L and P1, respectively. In the preferred embodiment, L is between 8.5 inches (21.6 cm) and 11 inches (28 cm) and W (FIG. 9) is between 0.25 inches (0.64 cm) and 0.5 inches (1.3 cm), so that P1 is between about 1.5 inches (3.8 cm) to 2.25 inches (5.7 cm). A similar front view of a multi-color pagewidth printer using sideshooter printhead subunits is shown in FIG. 11. Each of the pagewidth printheads uses the end-to-end abutment of printhead subunits, as shown in FIG. 8. The printing area is defined by the length L of the printing region of the pagewidth printheads and the height of four printheads with ink supplying manifolds 137 for each of the printheads so that the distance P2 of the stacked pagewidth printheads is about 3 inches (7.6 cm) to 4 inches (10 cm) which is greater than that of the roofshooter type print bar. Though a sideshooter type pagewidth printhead using abutted subunits as shown in FIG. 8 was used in FIG. 11, substantially the same or large printing zone would be required for a multicolor ink jet printer using a plurality of pagewidth printheads depicted in FIGS. 5 and 6. Structural bars 138 are fabricated of electrophoretically coated graphite, sintered metal, or the like.

The apparatus illustrated in FIGS. 1 through 11 constitute specific embodiments of the present invention. Any other suitable configurations can also be employed with the materials disclosed herein to form an apparatus of the present invention.

The electrophoretically coated porous, electrically conductive substrates employed as the substrates of the present invention are prepared by providing a porous, electrically conductive member of the dimensions and shape desired for the substrate and electrophoretically depositing thereon a coating of an organic material. Examples of materials suitable for the porous, electrically conductive substrate include graphite, sintered metals such as sintered bronze and sintered stainless steel, and the like. The finished coating is generally polymeric. This polymeric coating can be formed either by electrophoretically depositing the polymer on the substrate or by electrophoretically depositing monomers or oligomers onto the substrate and effecting polymerization thereof. For example, polypyrrole and polyaniline can be electropolymerized onto the surface of the substrate from an electrolyte solution of the respective monomers pyrrole and aniline. Electrophoretic deposition of polymers can be carried out from, for example, non-aqueous colloidal emulsions or solutions of polyimides, polyamides, polyamide-imides, polyamic acids, polysulfones, polyether sulfones, epoxy resins, styrenic polymers, polyparabanic acid polymers, polyarylene ether ketones, including substituted polyarylene ether ketones and polyarylene ether derivatives, thermosetting polyethersulfones, or the like. Electrodeposition of polyurethane paints from aqueous emulsions is also known for cathodic automotive coatings. Electrophoretic deposition of polymeric materials is known, as disclosed in, for example, U.S. Pat. No. 4,053,444, U.S. Pat. No. 3,943,065, U.S. Pat. No. 4,019,877, U.S. Pat. No. 3,676,383, U.S. Pat. No. 4,425,467, U.S. Pat. No. 4,425,474, U.S. Pat. No. 4,533,448, U.S. Pat. No. 4,642,170, U.S. Pat. No. 4,391,933, and U.S. Pat. No. 4,003,812, the disclosures of each of which are totally incorporated herein by reference.

In one specific embodiment, the desired organic material, such as an epoxy, is dissolved in a solvent. Thereafter, the solution is poured into a second solvent in which the organic material has limited solubility, thereby creating a colloidal suspension or emulsion. Charged particles or micelles are thus formed within the suspension, in which the particles have a relatively negative charge and the solvent has a relatively positive charge. Examples of suitable organic materials include epoxies, such as those of the formula 1004F (average n=4 to 6), with an epoxide equivalent of from about 800 to about 950 and a softening point of about 95° C., EPON 1007F (average n=10 to 15), with an epoxide equivalent of from about 1700 to about 2300 and a softening point of about 117° C., EPON 2002 (average n=2 to 4), with an epoxide equivalent of from about 675 to about 760 and a softening point of about 93° C., EPON 2004F (average n=4 to 6), with an epoxide equivalent of from about 875 to about 975 and a softening point of about 102° C., all available from Shell Oil Co., Houston, Tex., and the like. These epoxy

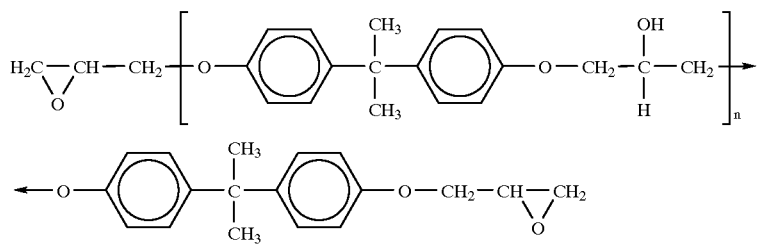

wherein n is an integer of from about 1 to about 26, and preferably from about 15 to about 26, such as EPON 1009, wherein n is from about 15 to about 26, with an epoxide equivalent of from about 2300 to about 3800 and a softening point of about 90° C., available from Shell Chemical Co., Houston, Tex. EPON 1001F (average n=2 or 3), with an epoxide equivalent of from about 525 to about 550 and a softening point of from about 75 to about 80° C., EPON resins can also be prepared by any known process, such as, for example, the reaction of phenol and acetone under acidic conditions to generate bisphenol A, followed by reaction of bisphenol A with epichlorohydrin in the presence of sodium hydroxide to form a chlorohydrin intermediate, followed by reaction of the intermediate with sodium hydroxide to generate the diglycidyl ether, as follows:

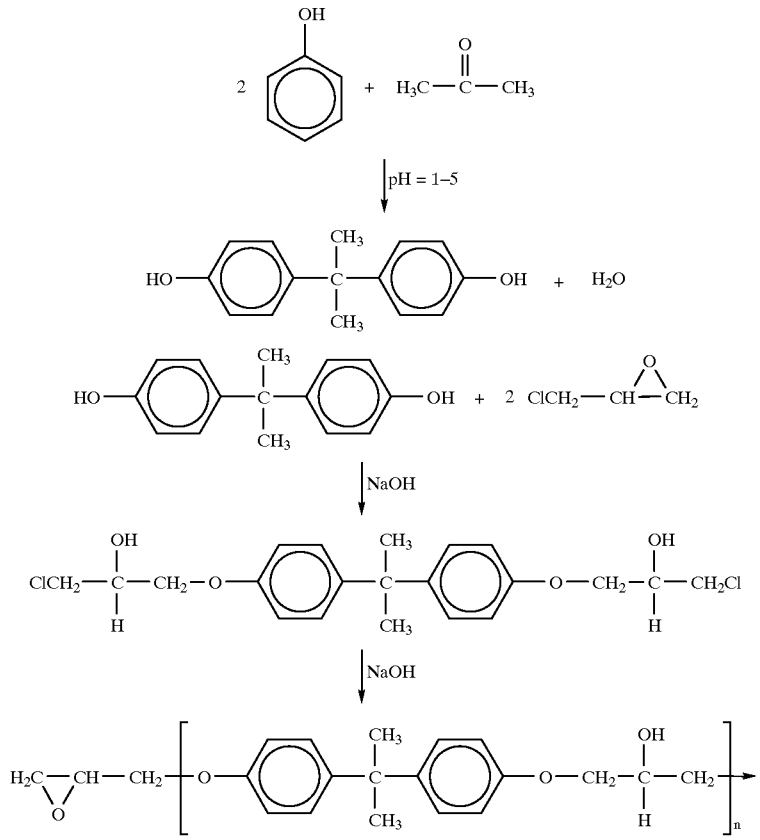

-continued

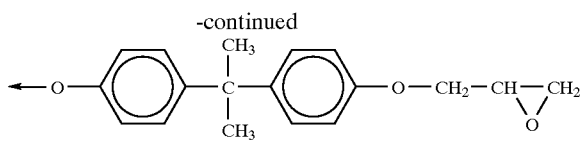

Also suitable are epoxy resins of the general formula

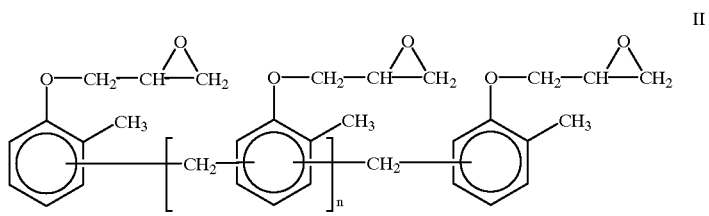

II wherein n is an integer of from 1 to about 25, and preferably is an integer of from about 2 to about 10. Epoxy resins of the above formula II are commercially available as, for example, EPON 164 (average n=3), with an epoxide equivalent of from about 200 to about 240 and a softening point of about 79° C., EPON DPS-155 (average n=1.6, with an epoxide equivalent of from about 174 to about 180 and a softening point of about 35° C., both available from Shell Oil Co., Houston, Tex., and the like. Also suitable are epoxy resins of the formula

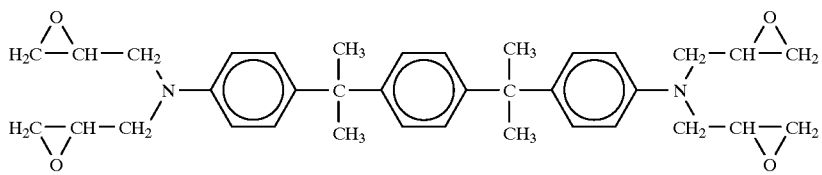

III

Epoxy resins of the above formula III are commercially available as, for example, EPON HPT 1071, available from Shell Oil Co., Houston, Tex., and the like. Further information regarding the synthesis and characterization of epoxy resins is disclosed in, for example, *Handbook of Epoxy Resins*, H. Lee and K. Neville, McGraw-Hill (1967), the disclosure of which is totally incorporated herein by reference. Higher molecular weight resins are preferred, and generally result in higher yields. Also suitable as organic materials are polyamic acids, polyamide-imides, polyimides, polyetherimides, polystyrenes, polyethersulfones, polysulfones, polyamides, polyarylene ether ketones and their derivatives, including substituted polyarylene ether ketones, such as haloalkylated polyarylene ether ketones, unsaturated ester substituted polyarylene ether ketones, hydroxyalkylated polyarylene ether ketones, polyarylene ether ketones substituted with unsaturated ammonium or phosphonium groups, and the like, thermosetting polyethersulfones, and the like. Polysulfones (Udel™), polyethersulfones (Victrex™), polyamide-imide (Al-830TM, Al-10H™, and the like) are available from Amoco. Polyimide (Pyre ML™) is available from E. I. DuPont de Nemours & Co. Preformed polyimide (Pl-2080TM) is available from Upjohn. Epoxy resins are available from Shell and Dow.

In one embodiment, the polymer is of the formula

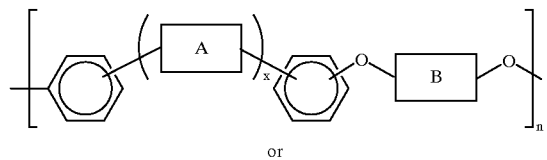

or

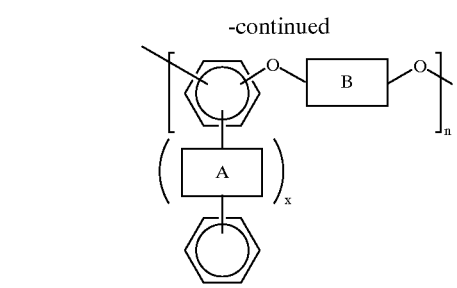

wherein x is an integer of 0 or 1, A is

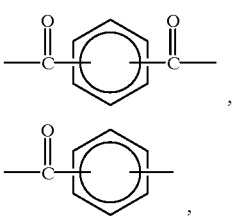

-continued
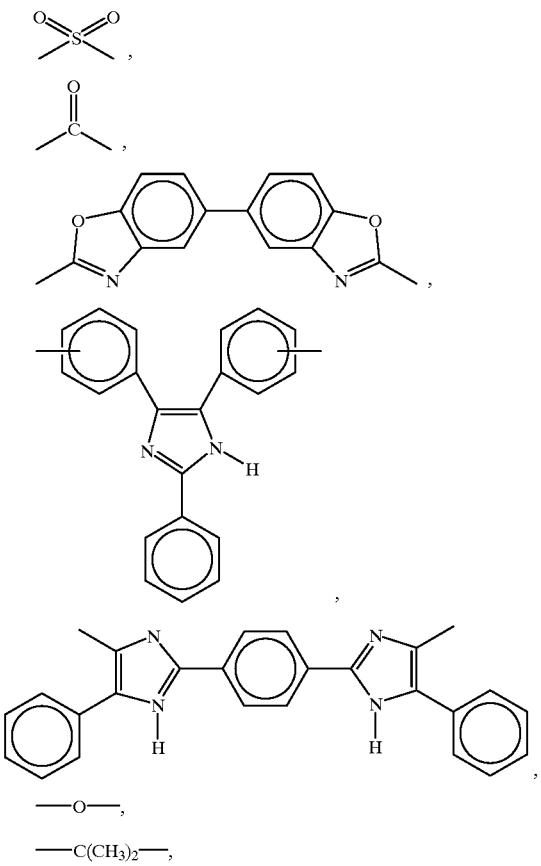
or mixtures thereof, B is
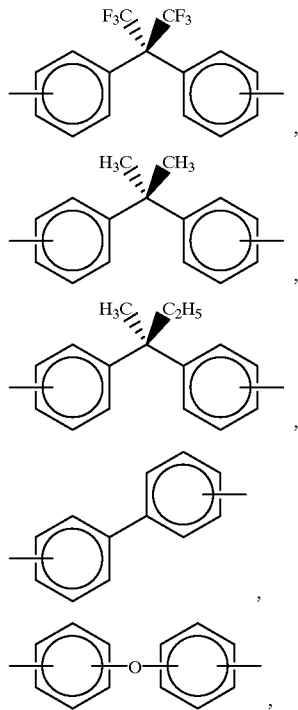
-continued
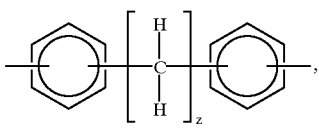
wherein v is an integer of from 1 to about 20,
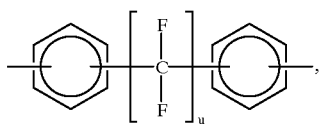
wherein z is an integer of from 2 to about 20,
wherein u is an integer of from 1 to about 20,
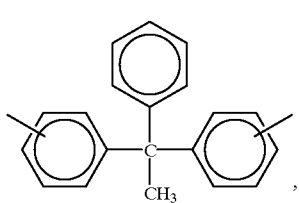

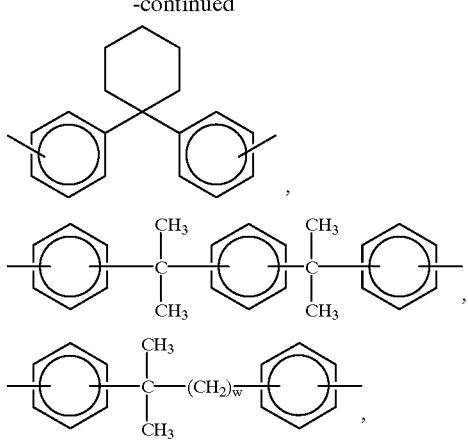

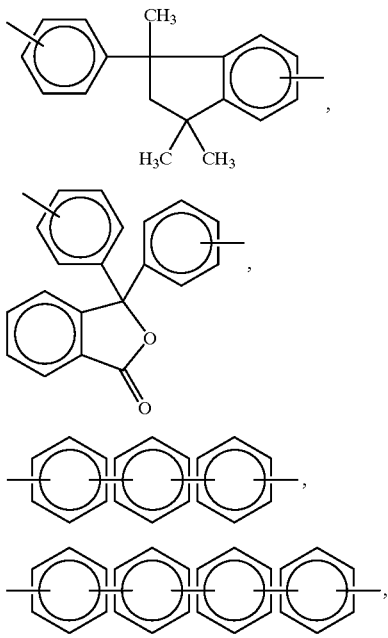

wherein w is an integer of from 1 to about 20, or mixtures thereof, and n is an integer representing the number of repeating monomer units. The value of n typically is such that the weight average molecular weight of the material is from about 1,000 to about 100,000, although the weight average molecular weight can be outside this range. The phenyl groups and the A and/or B groups may also be substituted, although the presence of two or more substituents on the B group ortho to the oxygen groups can render substitution difficult. Examples of suitable substituents include (but are not limited to) alkyl groups, including saturated, unsaturated, and cyclic alkyl groups, preferably with from 1 to about 6 carbon atoms, substituted alkyl groups, including saturated, unsaturated, and cyclic substituted alkyl groups, preferably with from 1 to about 6 carbon atoms, aryl groups, preferably with from 6 to about 24 carbon atoms, substituted aryl groups, preferably with from 6 to about 24 carbon atoms, arylalkyl groups, preferably with from 7 to about 30 carbon atoms, substituted arylalkyl groups, preferably with from 7 to about 30 carbon atoms, alkoxy groups, preferably with from 1 to about 6 carbon atoms, substituted alkoxy groups, preferably with from 1 to about 6 carbon atoms, aryloxy groups, preferably with from 6 to about 24 carbon atoms, substituted aryloxy groups, preferably with from 6 to about 24 carbon atoms, arylalkyloxy groups, preferably with from 7 to about 30 carbon atoms, substituted arylalkyloxy groups, preferably with from 7 to about 30 carbon atoms, hydroxy groups, amine groups, imine groups, ammonium groups, pyridine groups, pyridinium groups, ether groups, ester groups, amide groups, carbonyl groups, thiocarbonyl groups, sulfate groups, sulfonate groups, sulfide groups, sulfoxide groups, phosphine groups, phosphonium groups, phosphate groups, mercapto groups, nitroso groups, sulfone groups, acyl groups, acid anhydride groups, azide groups, and the like, wherein two or more substituents can be joined together to form a ring, wherein the substituents on the substituted alkyl groups, substituted aryl groups, substituted arylalkyl groups, substituted alkoxy groups, substituted aryloxy groups, and substituted arylalkyloxy groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, mixtures thereof, and the like, wherein two or more substituents can be joined together to form a ring.

Further information regarding the preparation of polysulfones, polyarylene ethers, polyarylene ether ketones, and the like is disclosed in, for example, P. M. Hergenrother, *J. Macromol. Sci. Rev. Macromol. Chem.*, C19 (1), 1–34 (1980); P. M. Hergenrother, B. J. Jensen, and S. J. Havens, *Polymer*, 29, 358 (1988); B. J. Jensen and P. M. Hergenrother, "High Performance Polymers," Vol. 1, No. 1) page 31 (1989), "Effect of Molecular Weight on Poly (arylene ether ketone) Properties"; V. Percec and B. C. Auman, *Makromol Chem.* 185, 2319 (1984); "High Molecular Weight Polymers by Nickel Coupling of Aryl Polychlorides," I. Colon, G. T. Kwaiatkowski, *J. of Polymer Science, Part A, Polymer Chemistry*, 28, 367 (1990); M. Ueda and T. Ito, *Polymer J.*, 23 (4), 297 (1991); "Ethynyl-Terminated Polyarylates: Synthesis and Characterization," S. J. Havens and P. M. Hergenrother, *J. of Polymer Science: Polymer Chemistry Edition*, 22, 3011 (1984); "Ethynyl-Terminated Polysulfones: Synthesis and Characterization," P. M. Hergenrother, *J. of Polymer Science: Polymer Chemistry Edition*, 20, 3131 (1982); K. E. Dukes, M. D. Forbes, A. S. Jeevarajan, A. M. Belu, J. M. DeDimone, R. W. Linton, and V. V. Sheares, *Macromolecules*, 29, 3081 (1996); G. Hougham, G. Tesoro, and J. Shaw, *Polym. Mater. Sci. Eng.*, 61, 369 (1989); V. Percec and B. C. Auman, *Makromol. Chem*, 185, 617 (1984); "Synthesis and characterization of New Fluorescent Poly(arylene ethers)," S. Matsuo, N. Yakoh, S. Chino, M. Mitani, and S. Tagami, *Journal of Polymer Science: Part A: Polymer Chemistry*, 32, 1071 (1994); "Synthesis of a Novel Naphthalene-Based Poly (arylene ether ketone) with High Solubility and Thermal Stability," Mami Ohno, Toshikazu Takata, and Takeshi Endo, *Macromolecules*, 27, 3447 (1994); "Synthesis and Characterization of New Aromatic Poly(ether ketones)," F. W. Mercer, M. T. Mckenzie, G. Merlino, and M. M. Fone, *J. of Applied Polymer Science*, 56, 1397 (1995); H. C. Zhang, T. L. Chen, Y. G. Yuan, Chinese Patent CN 85108751 (1991); "Static and laser light scattering study of novel thermoplastics. 1. Phenolphthalein poly(aryl ether ketone),"

C. Wu, S. Bo, M. Siddiq, G. Yang and T. Chen, *Macromolecules*, 29, 2989 (1996); "Synthesis of t-Butyl-Substituted Poly(ether ketone) by Nickel-Catalyzed Coupling Polymerization of Aromatic Dichloride", M. Ueda, Y. Seino, Y. Haneda, M. Yoneda, and J.-I. Suglyama, *Journal of Polymer Science: Part A: Polymer Chemistry*, 32, 675 (1994); "Reaction Mechanisms: Comb-Like Polymers and Graft Copolymers from Macromers 2. Synthesis, Characterzation and Homopolymerization of a Styrene Macromer of Poly(2,6dimethyl-1,4-phenylene Oxide)," V. Percec, P. L. Rinaldi, and B. C. Auman, *Polymer Bulletin*, 10, 397 (1983); *Handbook of Polymer Synthesis Part A*, Hans R. Kricheldorf, ed., Marcel Dekker, Inc., New York-Basel-Hong Kong (1992); and "Introduction of Carboxyl Groups into Crosslinked Polystyrene," C. R. Harrison, P. Hodge, J. Kemp, and G. M. Perry, *Die Makromolekulare Chemie*, 176, 267 (1975), the disclosures of each of which are totally incorporated herein by reference. Further background on high performance polymers is disclosed in, for example, U.S. Pat. No. 2,822,351; U.S. Pat. No. 3,065,205; British Patent 1,060,546; British Patent 971,227; British Patent 1,078,234; U.S. Pat. No. 4,175,175; N. Yoda and H. Hiramoto, *J. Macromol. Sci.-Chem.*, A21(13 & 14) pp. 1641 (1984) (Toray Industries, Inc., Otsu, Japan; B. Sillion and L. Verdet, "Polyimides and other High-Temperature polymers", edited by M. J. M. Abadie and B. Sillion, Elsevier Science Publishers B. V. (Amsterdam 1991); "Polyimides with Alicyclic Diamines. II. Hydrogen Abstraction and Photocrosslinking Reactions of Benzophenone Type Polyimides," Q. Jin, T. Yamashita, and K. Horie, *J. of Polymer Science: Part A: Polymer Chemistry*, 32, 503 (1994); Probimide™ 300, product bulletin, Ciba-Geigy Microelectronics Chemicals, "Photosensitive Polyimide System;" *High Performance Polymers and Composites*, J. I. Kroschwitz (ed.), John Wiley & Sons (New York 1991): and T. E. Atwood, D. A. Barr, T. A. King, B. Newton, and B. J. Rose, *Polymer*, 29, 358 (1988), the disclosures of each of which are totally incorporated herein by reference. Procedures for placing functional groups on aromatic polymers are disclosed in, for example, W. H. Daly, S. Chotiwana, and R. Nielsen, *Polymer Preprints*, 20(1), 835 (1979); "Functional Polymers and Sequential Copolymers by Phase Transfer Catalysis, 3. Synthesis And Characterization of Aromatic Poly(ether sulfone)s and Poly(oxy-2,6-dimethyl-1,4-phenylene). Containing Pendant Vinyl Groups," V. Percec and B. C. Auman, *Makromol. Chem.*, 185, 2319 (1984); F. Wang and J. Roovers, *Journal of Polymer Science: Part A: Polymer Chemistry*, 32, 2413 (1994); "Details Concerning the Chloromethylation of Soluble High Molecular Weight Polystyrene Using Dimethoxymethane, Thionyl Chloride, And a Lewis Acid: A Full Analysis," M. E. Wright, E. G. Toplikar, and S. A. Svejda, *Macromolecules*, 24, 5879 (1991); "Functional Polymers and Sequential Copolymers by Phase Transfer Catalysts," V. Percec and P. L. Rinaldi, *Polymer Bulletin*, 10, 223 (1983); "Preparation of Polymer Resin and Inorganic Oxide Supported Peroxy-Acids and Their Use in the Oxidation of Tetrahydrothiophene," J. A. Greig, R. D. Hancock, and D. C. Sherrington, *Euopean Polymer J.*, 16, 293 (1980); Preparation of Poly (vinylbenzyltriphenylphosphonium Perbromide) and its Application in the Bromination of Organic Compounds," A. Akelah, M. Hassanein, and F. Abdel-Galil, *European Polymer J.*, 20 (3) 221 (1984); J. M. J. Frechet and K. K. Haque, *Macromelcules*, 8, 130 (1975); U. S. Pat. No. 3,914,194; U.S. Pat. No. 4,110,279; U.S. Pat. No. 3,367,914; "Synthesis of Intermediates for Production of Heat Resistant Polymers (Chloromethylation of Diphenyl oxide)," E. P. Tepenitsyna, M. I. Farberov, and A. P. Ivanovski, *Zhurnal Prikladnoi Khimii*, Vol. 40, No. 11, 2540 (1967); U.S. Pat. No. 3,000, 839; Chem Abst. 56, 590f (1962); U.S. Pat. No. 3,128,258; Chem Abstr. 61, 4560a (1964); J. D. Doedens and H. P. Cordts, *Ind. Eng. Ch.*, 83, 59 (1961); British Patent 863,702; and Chem Abstr 55, 18667b (1961); the disclosures of each of which are totally incorporated herein by reference.

The photopatternable polymers containing these groups can be prepared by any suitable or desired process. For example, the desired functional group or groups can be applied directly to the polymer. Alternatively, one or more intermediate materials can be prepared. For example, the polymer backbone can be functionalized with a substituent which allows for the facile derivatization of the polymer backbone, such as hydroxyl groups, carboxyl groups, haloalkyl groups such as chloromethyl groups, hydroxyalkyl groups such as hydroxy methyl groups, methoxy methyl groups, alkylcarboxymethylene groups, and the like.

Unsaturated ester groups can be placed on the polymer backbone by any suitable or desired process. For example, substitution of the polymer can be accomplished by reacting the polymerin solution with (a) the appropriate unsaturated acid (such as acrylic acid, methacrylic acid, cinnamic acid, crotonic acid, ethacrylic acid, oleic acid, linoleic acid, maleic acid, fumaric acid, itaconic acid, citraconic acid, phenylmaleic acid, 3-hexene-1,6-dicarboxylic acid, or the like), and (b) a formaldehyde source (i.e., either formaldehyde or a material which, under the conditions of the reaction, generates formaldehyde; examples of formaldehyde sources in addition to formaldehyde include paraformaldehyde, trioxane, methylal, dimethoxymethane, and the like). The reaction is direct acid catalyzed; the polymer is dissolved in a suitable solvent and is allowed to react with the formaldehyde source at about 105° C. in the presence of catalytic amounts of paratoluenesulfonic acid. Examples of solvents suitable for the reaction include 1,1, 2,2-tetrachloroethane and, if a suitable pressure reactor is used, methylene chloride. Typically, the reactants are present in relative amounts with respect to each other (by weight) of about 10 parts polymer, about 5 parts formaldehyde source, about 1 part paratoluenesulfonic acid, about 15.8 parts of the appropriate acid (i.e., acrylic acid, methacrylic acid, or the like), about 0.2 parts hydroquinone methyl ether, and about 162 parts 1,1,2,2-tetrachloroethane.

The general reaction scheme, illustrated below for the reaction with acrylic acid, is as follows:

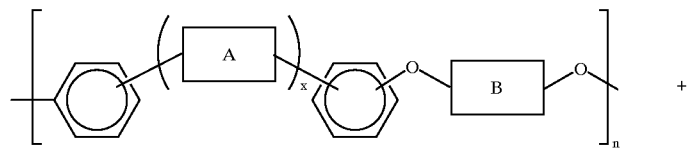

-continued
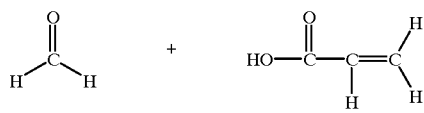
H⊕/MEHQ ↓
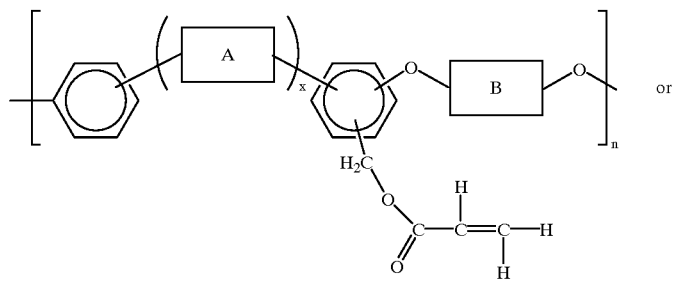

The resulting material is of the general formula

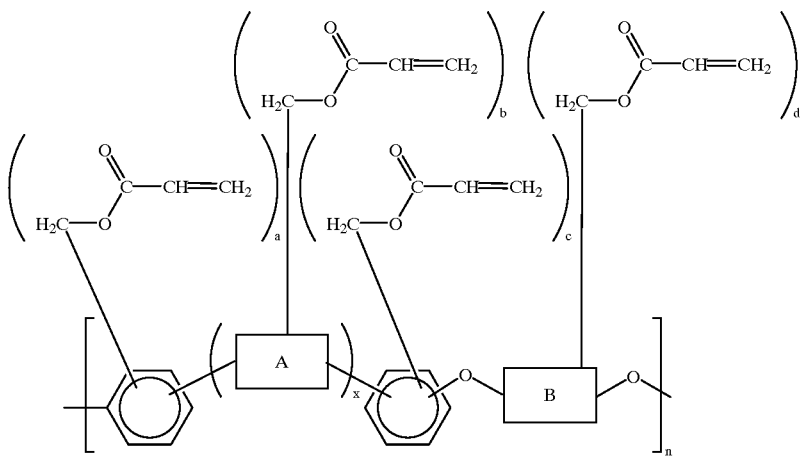

wherein a, b, c, and d are each integers of 0, 1, 2, 3, or 4, provided that at least one of a, b, c, and d is equal to or greater than 1 in at least some of the monomer repeat units of the polymer, and n is an integer representing the number of repeating monomer units. When methacrylic acid is used, the reaction proceeds as shown above except that the

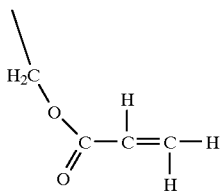

groups shown above are replaced with

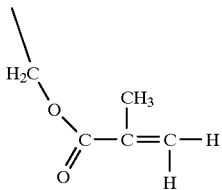

groups. When cinnamic acid is used, the reaction proceeds as shown above except that the

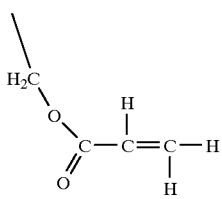

groups shown above are replaced with

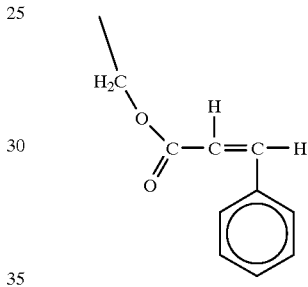

groups. Substitution is generally random, although the substituent may show a preference for the B group, and any given monomer repeat unit may have no substituents, one substituent, or two or more substituents. The most likely result of the reaction is that a monomer repeat unit will have 0 or 1 substituents.

Typical reaction temperatures are from about 25 to about 145° C., and preferably at about 105° C., although the temperature can be outside this range. Typical reaction times are from about 1 to about 6 hours, and preferably from about 2 to about 4 hours, although the time can be outside these ranges. Longer reaction times generally result in higher degrees of substitution. Higher degrees of substitution generally lead to greater photosensitivity of the polymer, and different degrees of substitution may be desirable for different applications. Too high a degree of substitution may lead to excessive sensitivity, resulting in crosslinking or chain extension of both exposed and unexposed polymer material when the material is exposed imagewise to activating radiation. Too low a degree of substitution may be undesirable because of resulting unnecessarily long exposure times or unnecessarily high exposure energies. For applications wherein the photopatternable polymer is to be used as a layer in a thermal ink jet printhead, the degree of substitution (i.e., the average number of unsaturated ester groups per monomer repeat unit) preferably is from about 0.25 to about 1.2, and more preferably from about 0.65 to about 0.8, although the degree of substitution can be outside these ranges for ink jet printhead applications. This degree of substitution generally corresponds to from about 0.5 to about 1.3 milliequivalents of unsaturated ester groups per gram of resin.

The polymers of the above general formula can also be substituted with photosensitivity-imparting groups such as unsaturated ester groups or the like by first preparing the haloalkylated derivative and then replacing at least some of the haloalkyl groups with unsaturated ester groups. For example, the haloalkylated polymer can be substituted with unsaturated ester groups by reacting the haloalkylated polymer with an unsaturated ester salt in solution. Examples of suitable reactants include selected salts of Groups IA, IIB, IIIB, IVB, VB, VIB, VIIB, VIIIB, IB, IIB, IIIA, IVA, and the like, of the periodic table with the appropriate unsaturated ester, such as the ester salts of acrylic acid, methacrylic acid, cinnamic acid, crotonic acid, ethacrylic acid, oleic acid, linoleic acid, maleic acid, fumaric acid, itaconic acid, citraconic acid, phenylmaleic acid, 3-hexene-1,6-dicarboxylic acid, and the like, with specific examples including sodium, potassium, quaternary ammonium, phosphonium, and the like salts of acrylate, methacrylate, cinnamate, and the like. Examples of solvents suitable for the reaction include polar aprotic solvents such as N,N-dimethylacetamide, dimethylsulfoxide, N-methylpyrrolidinone, dimethylformamide, and the like. Typically, the reactants are present in relative amounts with respect to each other by weight of about 10 parts haloalkylated polymer, about 66.5 parts solvent, and about 5.7 parts unsaturated ester salt.

The general reaction scheme, illustrated below for the acrylation of the chloromethylated polymer, is as follows:

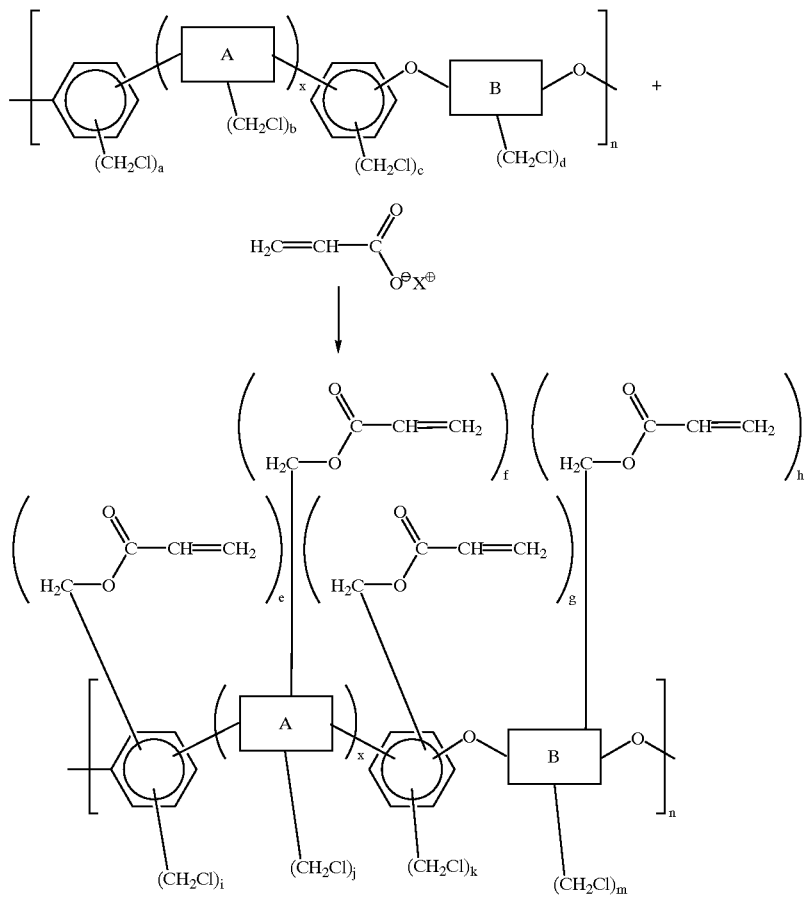

wherein X is any suitable cation, such as sodium, potassium, or the like, a, b, c, d, e, f, g, h, i, j, k, and m are each integers of 0, 1, 2, 3, or 4, provided that the sum of i+e is no greater than 4, the sum of j+f is no greater than 4, the sum of k+g is no greater than 4, and the sum of m+h is no greater than 4, provided that at least one of a, b, c, and d is equal to or greater than 1 in at least some of the monomer repeat units of the polymer, and provided that at least one of e, f, g, and h is equal to at least 1 in at least some of the monomer repeat units of the polymer, and n is an integer representing the number of repeating monomer units. In the corresponding reaction with the methacrylate salt, the reaction proceeds as shown above except that the

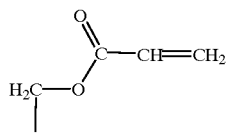

groups shown above are replaced with

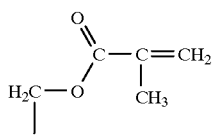

groups.

Ether groups and alkylcarboxymethylene groups can also be placed on the haloalkylated polymer by a process analogous to that employed to place unsaturated ester groups on the haloalkylated polymer, except that the corresponding alkylcarboxylate or alkoxide salt is employed as a reactant. In the corresponding reaction with the alkoxide salt, the reaction proceeds as shown above except that the

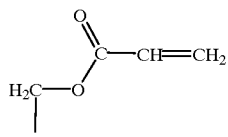

groups shown above are replaced with

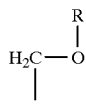

groups. Suitable ether groups include those wherein R is an alkyl group, preferably with from 1 to about 30 carbon atoms, more preferably with from 1 to about 15 carbon atoms, and most preferably with 1 carbon atom. In the corresponding reaction with the alkylcarboxylate salt, the reaction proceeds as shown above except that the

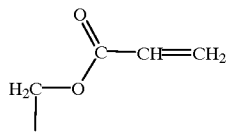

groups shown above are replaced with

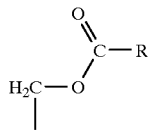

groups, wherein R is an alkyl group (including saturated, unsaturated, and cyclic alkyl groups), preferably with from 1 to about 30 carbon atoms, more preferably with from 1 to about 6 carbon atoms, a substituted alkyl group, an aryl group, preferably with from 6 to about 30 carbon atoms, more preferably with from 1 to about 2 carbon atoms, a substituted aryl group, an arylalkyl group, preferably with from 7 to about 35 carbon atoms, more preferably with from 7 to about 15 carbon atoms, or a substituted arylalkyl group, wherein the substituents on the substituted alkyl, aryl, and arylalkyl groups can be (but are not limited to) alkoxy groups, preferably with from 1 to about 6 carbon atoms, aryloxy groups, preferably with from 6 to about 24 carbon atoms, arylalkyloxy groups, preferably with from 7 to about 30 carbon atoms, hydroxy groups, amine groups, imine groups, ammonium groups, pyridine groups, pyridinium groups, ether groups, ester groups, amide groups, carbonyl groups, thiocarbonyl groups, sulfate groups, sulfonate groups, sulfide groups, sulfoxide groups, phosphine groups, phosphonium groups, phosphate groups, mercapto groups, nitroso groups, sulfone groups, acyl groups, acid anhydride groups, azide groups, and the like, wherein two or more substituents can be joined together to form a ring.

Higher degrees of haloalkylation generally enable higher degrees of substitution with unsaturated ester, ether, or alkylcarboxymethylene groups and thereby enable greater photosensitivity of the polymer. Different degrees of substitution with unsaturated ester, ether, or alkylcarboxymethylene groups may be desirable for different applications. Too high a degree of substitution may lead to excessive sensitivity, resulting in crosslinking or chain extension of both exposed and unexposed polymer material when the material is exposed imagewise to activating radiation, whereas too low a degree of substitution may be undesirable because of resulting unnecessarily long exposure times or unnecessarily high exposure energies. For applications wherein the photopatternable polymer is to be used as a layer in a thermal ink jet printhead, the degree of substitution (i.e., the average number of unsaturated ester, ether, or alkylcarboxymethylene groups per monomer repeat unit) preferably is from about 0.5 to about 1.2, and more preferably from about 0.65 to about 0.8, although the degree of substitution can be outside these ranges for ink jet printhead applications. Optimum amounts of substitution with unsaturated ester groups are from about 0.8 to about 1.3 milliequivalents of unsaturated ester, ether, or alkylcarboxymethylene group per gram of resin.

Some or all of the haloalkyl groups can be replaced with unsaturated ester, ether, or alkylcarboxymethylene substituents. Longer reaction times generally lead to greater degrees of substitution of haloalkyl groups with unsaturated ester, ether, or alkylcarboxymethylene substituents.

Typical reaction temperatures are from about 20 to about 35° C., and preferably about 25° C., although the temperature can be outside this range. Typical reaction times are from about 30 minutes to about 15 days, and preferably from about 2 hours to about 2 days, although the time can be outside these ranges. The reaction time can be reduced with the use of a catalyst, such as Adogen 464 (available from Aldrich Chemical Co., Milwaukee, Wis., or from Ashland Oil Co.), a long chain quaternary ammonium chloride salt, or the like. Adogen 464 is used at approximately 0.4 weight percent with respect to resin solids, and this catalyst results in a doubling of the reaction rate. Adogen 464 is sometimes difficult to remove from the product even after several water and methanol washes. Consequently, this catalyst sometimes results in cloudy photoresist solutions. The reaction can be accelerated slightly by the addition of 0.4 weight percent water, and can be inhibited by the addition of the same amount of methanol.

Intermediate derivatives can also be prepared by any suitable or desired process. For example, suitable processes for haloalkylating polymers include reaction of the polymers with formaldehyde and hydrochloric acid, bischloromethyl ether, chloromethyl methyl ether, octylchloromethyl ether, or the like, generally in the presence of a Lewis acid catalyst. Bromination of a methyl group on the polymer can also be accomplished with elemental bromine via a free radical process initiated by, for example, a peroxide initiator or light. Halogen atoms can be substituted for other halogens already on a halomethyl group by, for example, reaction with the appropriate hydrohalic acid or halide salt. Methods for the haloalkylation of polymers are also disclosed in, for example, "Chloromethylation of Condensation Polymers Containing an Oxy-1,4-Phenylene Backbone," W. H. Daly et al., *Polymer Preprints*, Vol. 20, No. 1, 835 (1979), the disclosure of which is totally incorporated herein by reference.

One specific process suitable for haloalkylating the polymer entails reacting the polymer with an acetyl halide, such as acetyl chloride, and dimethoxymethane in the presence of a halogen-containing Lewis acid catalyst, such as those of the general formula $$M^{n\oplus}X_n$$

wherein n is an integer of 1, 2, 3, 4, or 5, M represents a boron atom or a metal atom, such as tin, aluminum, zinc, antimony, iron (III), gallium, indium, arsenic, mercury, copper, platinum, palladium, or the like, and X represents a halogen atom, such as fluorine, chlorine, bromine, or iodine, with specific examples including $SnCl_4$, $AlCl_3$, $ZnCl_2$, $AlBr_3$, $BF_3$, $SbF_5$, $FeI_3$, $GaBr_3$, $InCl_3$, $AsI_5$, $HgBr_2$, $CuCl$, $PdCl_2$, $PtBr2$, or the like. Care must be taken to avoid cross-linking of the haloalkylated polymer. Typically, the reactants are present in relative amounts by weight of about 35.3 parts acetyl halide, about 37 parts dimethoxymethane, about 1.2 parts methanol, about 0.3 parts Lewis acid catalyst, about 446 parts 1,1,2,2-tetrachloroethane, and abut 10 to 20 parts polymer. 1,1,2,2-Tetrachlorethane is a suitable reaction solvent. Dichloromethane is low boiling, and consequently the reaction is slow in this solvent unless suitable pressure equipment is used.

The general reaction scheme is as follows:

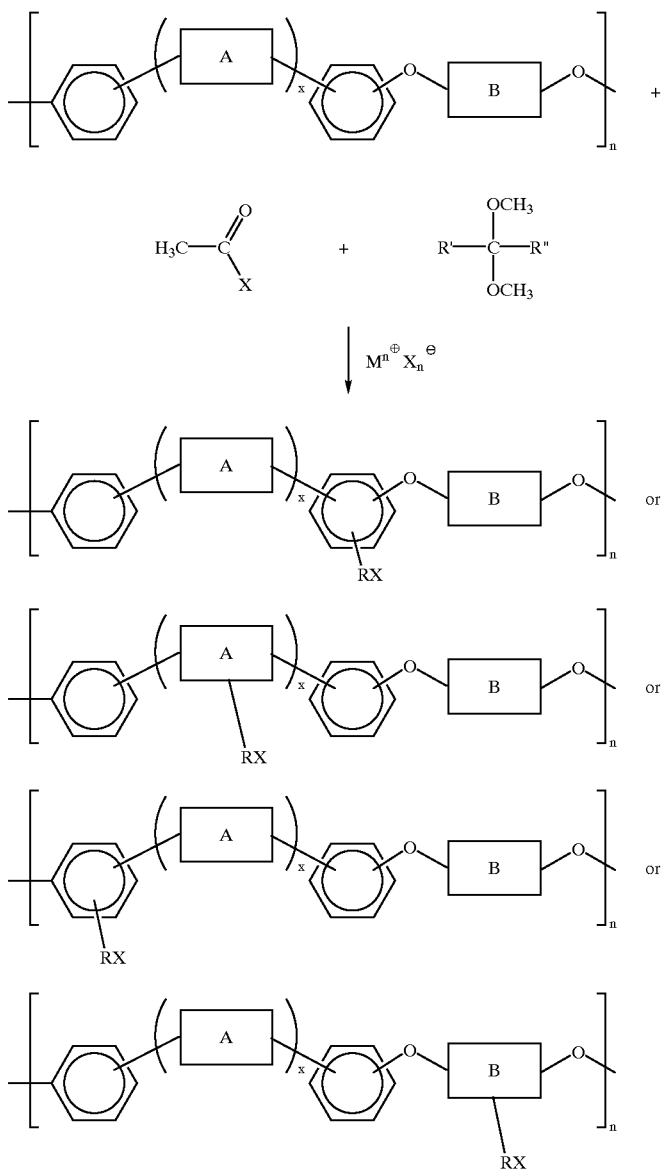

wherein R' and R" each, independently of the other, can be (but are not limited to) hydrogen atoms, alkyl groups, including saturated, unsaturated, and cyclic alkyl groups, preferably with from 1 to about 11 carbon atoms, substituted alkyl groups, preferably with from 1 to about 11 carbon atoms, aryl groups, preferably with from 6 to about 11 carbon atoms, substituted aryl groups, preferably with from 6 to about 11 carbon atoms, arylalkyl groups, preferably with from 7 to about 11 carbon atoms, substituted arylalkyl groups, preferably with from 7 to about 11 carbon atoms, and the like. The resulting material is of the general formula

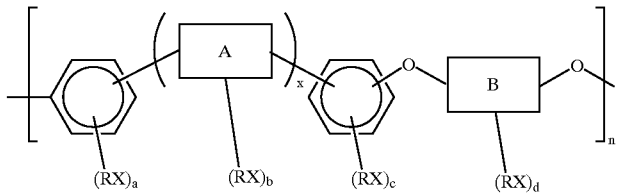

wherein n is an integer of 1, 2, 3, 4, or 5, R is an alkyl group, including both saturated, unsaturated, linear, branched, and cyclic alkyl groups, preferably with from 1 to about 11 carbon atoms, more preferably with from 1 to about 5 carbon atoms, even more preferably with from 1 to about 3 carbon atoms, and most preferably with 1 carbon atom, a substituted alkyl group, an arylalkyl group, preferably with from 7 to about 29 carbon atoms, more preferably with from 7 to about 17 carbon atoms, even more preferably with from 7 to about 13 carbon atoms, and most preferably with from 7 to about 9 carbon atoms, or a substituted arylalkyl group, and X is a halogen atom, such as fluorine, chlorine, bromine, or iodine, a, b, c, and d are each integers of 0, 1, 2, 3, or 4, provided that at least one of a, b, c, and d is equal to or greater than 1 in at least some of the monomer repeat units of the polymer, and n is an integer representing the number of repeating monomer units. Examples of suitable substituents on the substituted alkyl, aryl, and arylalkyl groups include (but are not limited to) alkyl groups, including saturated, unsaturated, linear, branched, and cyclic alkyl groups, preferably with from 1 to about 6 carbon atoms, substituted alkyl groups, preferably with from 1 to about 6 carbon atoms, aryl groups, preferably with from 6 to about 24 carbon atoms, substituted aryl groups, preferably with from 6 to about 24 carbon atoms, arylalkyl groups, preferably with from 7 to about 30 carbon atoms, substituted arylalkyl groups, preferably with from 7 to about 30 carbon atoms, alkoxy groups, preferably with from 1 to about 6 carbon atoms, substituted alkoxy groups, preferably with from 1 to about 6 carbon atoms, aryloxy groups, preferably with from 6 to about 24 carbon atoms, substituted aryloxy groups, preferably with from 6 to about 24 carbon atoms, arylalkyloxy groups, preferably with from 7 to about 30 carbon atoms, substituted arylalkyloxy groups, preferably with from 7 to about 30 carbon atoms, amine groups, imine groups, ammonium groups, pyridine groups, pyridinium groups, ether groups, ester groups, amide groups, carbonyl groups, thiocarbonyl groups, sulfate groups, sulfonate groups, sulfide groups, sulfoxide groups, phosphine groups, phosphonium groups, phosphate groups, mercapto groups, nitroso groups, sulfone groups, acyl groups, acid anhydride groups, azide groups, and the like, wherein the substituents on the substituted alkyl groups, substituted aryl groups, substituted arylalkyl groups, substituted alkoxy groups, substituted aryloxy groups, and substituted arylalkyloxy groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, mixtures thereof, and the like, wherein any two or more substituents can be joined together to form a ring. Substitution is generally random, although the substituent often indicates a preference for the B group, and any given monomer repeat unit may have no haloalkyl substituents, one haloalkyl substituent, or two or more haloalkyl substituents, wherein a, b, c, and d are each integers of 0, 1, 2, 3, or 4, provided that at least one of a, b, c, and d is equal to or greater than 1 in at least some of the monomer repeat units of the polymer, and n is an integer representing the number of repeating monomer units.

Substitution is generally random, although the substituent often indicates a preference for the B group, and any given monomer repeat unit may have no haloalkyl substituents, one haloalkyl substituent, or two or more haloalkyl substituents.

Typical reaction temperatures are from about 60 to about 120° C., and preferably from about 80 to about 110° C., although the temperature can be outside these ranges. Typical reaction times are from about 1 to about 10 hours, and preferably from about 2 to about 4 hours, although the time can be outside these ranges. Longer reaction times generally result in higher degrees of haloalkylation. When the haloalkylated polymer is used as an intermediate material in the synthesis of polymers substituted with photoactive groups such as unsaturated ester groups, higher degrees of haloalkylation generally enable higher degrees of substitution with photoactive groups and thereby enable greater photosensitivity of the polymer. Different degrees of haloalkylation may be desirable for different applications. When the material is used as an intermediate in the synthesis of the polymer substituted with unsaturated ester groups, too high a degree of substitution may lead to excessive sensitivity, resulting in crosslinking or chain extension of both exposed and unexposed polymer material when the material is exposed imagewise to activating radiation, whereas too low a degree of substitution may be undesirable because of resulting unnecessarily long exposure times or unnecessarily high exposure energies. For applications wherein the photopatternable polymer is to be used as a layer in a thermal ink jet printhead, the degree of substitution (i.e., the average number of unsaturated ester groups per monomer repeat unit) preferably is from about 0.5 to about 1.2, and more preferably from about 0.7 to about 0.8, although the degree of substitution can be outside these ranges for ink jet printhead applications. The halomethylated polymer can also be used as a photoresist in its own right when energy sources such as electron beams, deep ultraviolet light, or the like are used.

A curing agent can also be included in the electrocoating bath if desired or necessary. When an epoxy resin is used as the organic material, curing agents are highly desirable. Curatives generally are not necessary with polyamic acids since they undergo thermal condensation to produce polyimides and polyamide-imides. Curatives also generally are not needed with polysulfones, which are engineering thermal plastics. Chloromethylated polyethersulfones and chloromethylated polyarylene ether ketones are thermosetting resins and generally do not require curatives. When present, any suitable or desired curing agent can be employed. Examples suitable for epoxy resins include various aromatic and aliphatic diamines and polyamines, including diethylenetriamine, triethylenetetraamine, tetraethylenepentaamine, piperazine, the amine curing agent "Y" (available from Shell Chemical Co., Houston, Tex.), polyamide curing agents include EPI-CURE® 3125 and 3140, available from Shell Oil Company, Houston, Tex., other primary, secondary, and tertiary aliphatic and aromatic amines, amides, acids, acid anhydrides, and the like. Numerous examples of suitable curing agents are disclosed in, for example, *Handbook of Epoxy Resins*, H. Lee and K. Neville, McGraw-Hill (1967), the disclosure of which is totally incorporated herein by reference. The solvents employed are, of course, selected in view of the solubility characteristics of the chosen organic material. For example, when epoxy resins such as EPON 1009 are used as the organic material, examples of good solvents for the epoxy include toluene, cyclohexanone, polar aprotic solvents such as N-methylpyrrolidinone, dimethylacetamide, dimethylformamide, dimethyl sulfoxide, and the like, and examples of solvents in which the epoxy has limited solubility include methyl isobutyl ketone, acetonitrile, hexanes, cyclohexanes, and the like.

The organic material can also include filler particles if desired to enhance the thermal conductivity of the coating. Examples of suitable filler particles include ceramic particles, aluminum oxide particles, aluminum nitride particles, silicon carbide particles, mica powder, diamond powder, and the like. Preferred fillers generally are thermally conductive but are not electrically conductive. The particles are of any suitable or desired average particle diameter, typically being about 0.01 micron or less, and preferably less than about 50 nanometers, although the diameter can be outside these ranges. The filler particles are present in the organic material in any desired relative amount, typically being present in an amount of from about 10 to about 50 percent by weight of the organic material, although the amount can be outside this range.

The organic material, the good solvent, and the limited solvent are present in the electrocoating bath in any desired or suitable relative amounts. Typically, the organic material is present in an amount of from about 0.1 to about 5 percent by weight, and preferably about 0.5 percent by weight, although the amount can be outside this range. Typically, the good solvent is present in an amount of from about 10 to about 30 percent by weight, and preferably from about 15 to about 26 percent by weight, although the amount can be outside these ranges. Typically, the limited solvent is present in an amount of from about 70 to about 90 percent by weight, and preferably from about 70 to about 85 percent by weight, although the amount can be outside these ranges. Typically, the curing agent, if present, is present in an amount of from about 10 to about 50 percent by weight of the polymer (or monomer) solids, and preferably about 50 percent by weight of the polymer (or monomer) solids, although the amount can be outside this range.

The particle size obtained within the colloidal emulsion is determined in part by the relative amounts of the components present in the emulsion. The solvent/nonsolvent ratio is optimized to obtain a uniform coating with the desired characteristics. Typically, when the amount of solvent is too high with respect to the amount of nonsolvent, "runny" electrocoatings result, whereas when the amount of nonsolvent is too high with respect to the amount of solvent, precipitation of the polymer can result, as well as poor, granular electrocoatings. The ratio is adjusted until aesthetically pleasing coatings are achieved (before and after cure). Temperature and current will also affect particle size. Typically, temperatures that are too high tend to destabilize the colloids, and currents that are too high result in excessive film build-ups, which can sometimes fall off the electrode as sediment. Preferred average particle diameters are from about 0.01 to about 10 microns, and preferably are about 0.1 micron or less, and preferred particles have radii of less than about 150 nanometers.

Particle or micelle size within the colloidal emulsion is related to the thickness of the layer of organic material deposited on the porous, electrically conductive substrate. Typically, the coating obtained comprises only a few layers of particles or micelles. The process is self-limiting in that a uniform, thin layer is formed and deposition ceases when the thin layer forms, since the porous, electrically conductive is an electrical conductor while the organic material coated thereon is typically relatively electrically insulating. For example, to obtain a coating thickness on the porous, electrically conductive substrate of from about 0.5 to about 1 micron, desirable average particle or micelle diameters would typically be about 0.1 micron or less.

Electrophoretic deposition is carried out by placing the colloidal solution or emulsion of the organic material in a container. The porous, electrically conductive substrate is suspended in the electrocoating bath by any desired or suitable method; for example, the porous, electrically conductive substrate can be suspended with a wire and alligator clip. The porous, electrically conductive substrate functions as a first charged electrode. A second electrode is also suspended in the emulsion and functions as the oppositely charged electrode. For electrodeposition of negatively charged micelles, upon application of current to generate the relative charges at the electrodes, the solvent, which is relatively positively charged, becomes disassociated with the relatively negatively charged organic micelles, and the organic micelles then are attracted to and adhere to the positively charged porous, electrically conductive substrate. For electrodeposition of positively charged micelles, upon application of current to generate the relative charges at the electrodes, the solvent, which is relatively negatively charged, becomes disassociated with the relatively positively charged organic micelles, and the organic micelles then are attracted to and adhere to the negatively charged porous, electrically conductive substrate. Alternatively, the colloidal emulsion can be placed in an electrically conductive container, such as steel, and the container can function as one charged electrode while the porous, electrically conductive substrate functions as the other, oppositely charged electrode.

Any suitable or desired voltages and currents can be applied during the process. Typical currents are from about 0.01 to about 1,000 milliamps, and preferably from about 0.01 to about 10 milliamps, although the value con be outside these ranges. Typical electrophoretic deposition voltages are from about 1 to about 350 volts, and preferably are from about 10 to about 200 volts, although the voltage can be outside these ranges.

The electrophoretic deposition process enables advantages such as the ability to deposit a uniform coating even in areas of the porous, electrically conductive substrate which are difficult to access, such as the inside diameter areas of long tubes, without forming an excess of coating material on easily accessible areas of the porous, electrically conductive substrate. In some instances, optimal results are obtained when the substrate is removed from the both and returned thereto for one or more additional coating steps. Since the process is self-limiting, leaving the porous, electrically conductive substrate in the bath for extended periods of time or returning the substrate to the bath a repeated number of times enables deposition of the organic material in areas which are difficult to access without causing buildup in easily accessible areas.

The semiconductor chips are permanently mounted on the coated porous, electrically conductive substrate by any suitable or desired method. In one embodiment, the chips are bonded to the substrate with a silver filled epoxy, such as H20E, obtained from Epoxy Technology Inc., Billerica, Mass., or the like. This epoxy enables both good bonding characteristics and good thermal contact between the substrate and the chips. Other thermally conductive fillers may also be used, such as gold, aluminum nitride, or the like, and other bonding resins may also be used, such as polyimide or the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A colloidal emulsion was prepared by admixing 2 grams of EPON 1009 epoxy resin, obtained from Shell Chemical Co., Houston, Tex., 2 grams of triethylene tetramine (obtained from Aldrich Chemical Co., Milwaukee, Wis.), and 40 milliliters of cyclohexanone with magnetic stirring and heating at 85° C. until the solution turned red, for about 4 hours. Thereafter, an additional 40 milliliters of cyclohexanone was added and the solution was allowed to cool to 25° C. The polymer solution was then added with stirring to 280 milliliters of methyl isobutyl ketone. The colloidal emulsion thus formed was placed in a stainless steel container and a graphite substrate previously machined to the desired shape was suspended in the emulsion as a first, positively charged electrode, while the stainless steel container served as a second, negatively charged electrode. The graphite substrate was suspended in the colloidal emulsion for a period of 2 minutes while conditions of 100 volts and about 100 microamps (0.01 milliAmp) were applied across the electrode. The graphite substrate was then removed from the emulsion. The process was repeated two more times at periods of one minute each. Thereafter, the epoxy resin deposited on the graphite substrate was cured by heating the coated substrate to a temperature of about 150° C. for about 1 hour. No cracking of the underlayers was observed in the successive epoxy coatings.

The resulting coated substrate was bonded to a silicon printhead die by applying silver filled H20E epoxy (obtained from Epoxy Technology Inc., Billerica, Mass.) to the substrate, followed by heating at 2° C. per minute until 150° C. was achieved. The printhead and heat sink were clamped into position with pressure, which was maintained until the adhesive had fully cured. Good adhesion of the die to the substrate was observed. The resulting printhead was also aesthetically pleasing and exhibited no tendency to shed graphite particles. The epoxy coated graphite heat sink offered the following additional advantages: bonding of dies to the coated graphite was markedly improved over that to the uncoated graphite; water and solvents from the thermal ink jet inks no longer permeated into the pores of the coated graphite, whereas with the uncoated graphite the inks permeated the graphite pores, weakening adhesive bonds. The thin coating of epoxy resin on the graphite did not interfere with the thermal conducting properties of the graphite or interfere with its function as a heat sink.

EXAMPLE II

Victrex 300P, obtained from Amoco, Bound Brook, N.J., is chloromethylated by the process disclosed in "Chloromethylation of Condensation Polymers Containing an Oxy-1, 4-phenylene Backbone," W. H. Daly et al., *Polymer Preprints*, Vol. 20, No. 1, 835 (1979), the disclosure of which is totally incorporated herein by reference, resulting in formation of a polymer believed to be of the formula

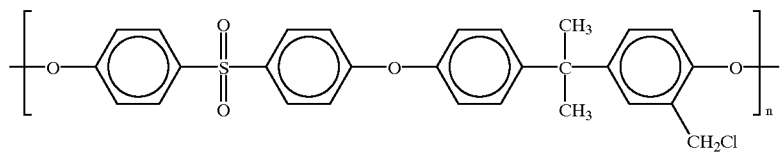

wherein n is an integer representing the number of repeating monomer units, said polymer having 0.25 chloromethyl groups per repeat monomer unit. Thereafter, (11.22 grams) of the polymer with 1 chloromethyl group per repeat unit in N-methylpyrrolidinone (246.5 grams) is added to acetone (1357 milliliters) with magnetic stirring in a stainless steel beaker which serves as the negatively charged electrode. Graphite heat sinks which serve as the positive electrode are then electrocoated at 100 volts d.c. for 2 minutes. The coated graphite heat sink is then removed from the bath, and the acetone is allowed to evaporate. Thereafter, the heat sink is heated at 2° C. per minute until 250° C. is achieved and the temperature of 250° C. is maintained for 2 hours. The graphite heat sink has a crosslinked polyethersulfone coating which, it is believed, will be resistant to attack from thermal ink jet inks.

EXAMPLE III

A polyarylene ether ketone of the formula

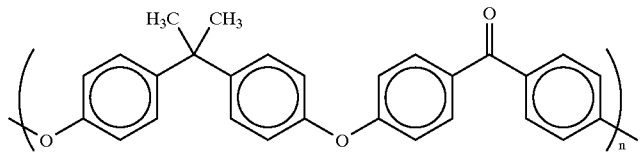

wherein n is between about 2 and about 30 (hereinafter referred to as poly(4-CPK-BPA)) was prepared as follows. A 5 liter, 3-neck round-bottom flask equipped with a Dean-Stark (Barrett) trap, condenser, mechanical stirrer, argon inlet, and stopper was situated in a heating mantle. 4,4'-Dichlorobenzophenone (Aldrich 11,370, Aldrich Chemical Co., Milwaukee, Wis., 250 grams), bis-phenol A (Aldrich 23,965–8, 244.8 grams), potassium carbonate (327.8 grams), anhydrous N,N-dimethylacetamide (1,500 milliliters), and toluene (275 milliliters) were added to the flask and heated to a reaction temperature of 175° C. while the volatile toluene component was collected and removed. After 48 hours of heating at vigorous reflux with continuous stirring, the reaction mixture was filtered to remove insoluble salts, and the resultant solution was added to methanol (5 gallons) to precipitate the polymer. The polymer was isolated by filtration, and the wet filter cake was washed with water (3 gallons) and then with methanol (3 gallons). The yield was 360 grams of vacuum dried product. The molecular weight of the polymer was determined by gel permeation chromatography (gpc) (elution solvent was tetrahydrofuran) with the following results: $M_n$ 9760, $M_{peak}$ 23,300, $M_w$ 23,300, $M_z$ 39,300, and $M_{z+1}$ 54,800. Solution cast films from methylene chloride were clear, tough, and flexible. As a result of the stoichiometries used in the reaction, it is believed that this polymer had end groups derived from bis-phenol A.

A solution of chloromethyl ether in methyl acetate was made by adding 282.68 grams (256 milliliters) of acetyl chloride to a mixture of dimethoxy methane (313.6 grams, 366.8 milliliters) and methanol (10 milliliters) in a 5 liter 3-neck round-bottom flask equipped with a mechanical stirrer, argon inlet, reflux condenser, and addition funnel. The solution was diluted with 1,066.8 milliliters of 1,1,2,2-tetrachloroethane and then tin tetrachloride (2.4 milliliters) was added via a gas-tight syringe along with 1,1,2,2-tetrachloroethane (133.2 milliliters) using an addition funnel. The reaction solution was heated to 500° C. Thereafter, a solution of poly(4-CPK-BPA) prepared as described above (160.8 grams) in 1,000 milliliters of tetrachloroethane was added rapidly. The reaction mixture was then heated to reflux with an oil bath set at 110° C. After 2 hours reflux with continuous stirring, heating was discontinued and the mixture was allowed to cool to 25° C. The reaction mixture was transferred in stages to a 2 liter round bottom flask and concentrated using a rotary evaporator with gentle heating up to 50° C. while reduced pressure was maintained with a vacuum pump trapped with liquid nitrogen. The concentrate was added to methanol (4 gallons) to precipitate the polymer using a Waring blender. The polymer was isolated by filtration and vacuum dried to yield 200 grams of poly(4-CPK-BPA) with 1.5 chloromethyl groups per repeat unit as identified using $^1$H NMR spectroscopy. The molecular weight of the polymer was determined by gel permeation chromatography (gpc) (elution solvent was tetrahydrofuran) with the following results: $M_n$ 12,000, $M_{peak}$ 26,000, $M_w$ 40,700, $M_z$ 97,000, and $M_{z+1}$ 170,000.

Solvent free polymer was obtained by reprecipitation of the polymer (75 grams) in methylene chloride (500 grams) into methanol (3 gallons) followed by filtration and vacuum drying to yield solvent free polymer.

EXAMPLE IV

The process described in Example II was carried out as described except that the chloromethylated Victrex 300P was replaced with a chloromethylated polyarylene ether ketone with 1.5 chloromethyl groups per repeat unit, prepared as described in Example III, the polarity was reversed (i.e., the graphite heat sinks were negatively charged and the stainless steel beaker was positively charged), and electrocoating was carried out at 100 V for 3 minutes. Subsequent to coating, the coated graphite substrate was heated at 110° C. for 20 minutes, followed by raising the temperature at a rate of 2° C. per minute to 250° C., followed by maintaining the temperature at 250° C. for 2 hours to cure the polymeric coating. The resulting coating was about 10 microns thick.

EXAMPLE V

A chloromethylated polyarylene ether ketone having 1.5 chloromethyl groups per repeat monomer unit was prepared as described in Example III. A solution was prepared containing 90 grams of the chloromethylated polymer in 639 milliliters (558.5 grams) of N,N-dimethylacetamide and the solution was magnetically stirred at 25° C. with sodium acrylate (51.39 grams) for 1 week. The reaction mixture was then centrifuged, and the supernate was added to methanol (4.8 gallons) using a Waring blender in relative amounts of 25 milliliters of polymer solution per 0.75 liter of methanol. The white powder that precipitated was filtered, and the wet filter cake was washed with water (3 gallons) and then methanol (3 gallons). The polymer was then isolated by filtration and vacuum dried to yield 73.3 grams of a white powder. The polymer had 3 acrylate groups for every 4 repeating monomer units and 3 chloromethyl groups for every 4 repeating monomer units and a weight average molecular weight of about 90,000.

EXAMPLE VI

The process described in Example II was carried out as described except that the chloromethylated Victrex 300P was replaced with an acryloylated and chloromethylated polyarylene ether ketone with 1.5 chloromethyl groups per repeat unit, prepared as described in Example V, the polarity was reversed (i.e., the graphite heat sinks were negatively charged and the stainless steel beaker was positively charged), and electrocoating was carried out at 100 V for 3 minutes. Subsequent to coating, the coated graphite substrate was heated at 110° C. for 20 minutes, followed by raising the temperature at a rate of 2° C. per minute to 250° C., followed by maintaining the temperature at 250° C. for 2 hours to cure the polymeric coating. The resulting coating was about 10 microns thick.

EXAMPLE VII

A polymer of the formula

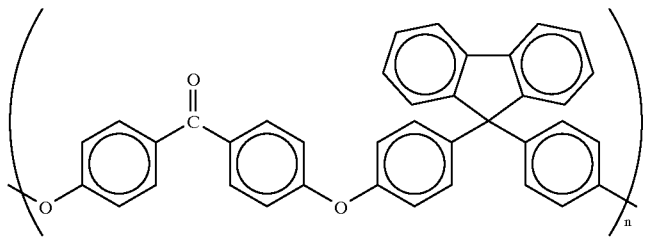

wherein n represents the number of repeating monomer units was prepared as follows. A 1-liter, 3-neck round-bottom flask equipped with a Dean-Stark (Barrett) trap, condenser, mechanical stirrer, argon inlet, and stopper was situated in a silicone oil bath. 4,4'-Difluorobenzophenone (Aldrich Chemical Co., Milwaukee, Wis., 43.47 grams, 0.1992 mol), 9,9'-bis(4-hydroxyphenyl)fluorenone (Ken Seika, Rumson, N.J., 75.06 grams, 0.2145 mol), potassium carbonate (65.56 grams), anhydrous N,N-dimethylacetamide (300 milliliters), and toluene (52 milliliters) were added to the flask and heated to 175° C. (oil bath temperature) while the volatile toluene component was collected and removed. After 5 hours of heating at 175° C. with continuous stirring, the reaction mixture was allowed to cool to 25° C. The solidified mass was treated with acetic acid (vinegar) and extracted with methylene chloride, filtered, and added to methanol to precipitate the polymer, which was collected by filtration, washed with water, and then washed with methanol. The yield of vacuum dried product, poly(4-FPK-FBPA), was 71.7 grams. The polymer was analyzed by gel permeation chromatography (gpc) (elution solvent was tetrahydrofuran) with the following results: $M_n$ 59,100, $M_{peak}$ 144,000, $M_w$ 136,100, $M_z$ 211,350, and $M_{z+1}$ 286,100.

EXAMPLE VIII

The poly(4-FPK-FBPA) prepared as described in Example VII is chloromethylated by the process described in Example III, resulting in formation of poly(4-FPK-FBPA) with 1.5 chloromethyl groups per repeat monomer unit. The chloromethylated polymer is then coated onto a graphite substrate by the process described in Example IV. It is believed that similar results will be obtained.

EXAMPLE IX

The chloromethylated poly(4-FPK-FBPA) prepared as described in Example VIII is acryloylated by the process described in Example V, resulting in formation of poly(4-FPK-FBPA) with 3 chloromethyl groups per every 4 repeat monomer units and 3 acryloyl groups per every 4 repeat monomer units. The acryloylated and chloromethylated polymer is then coated onto a graphite substrate by the process described in Example VI. It is believed that similar results will be obtained.

Other embodiments and modifications of the present invention may occur to those skilled in the art subsequent to a review of the information presented herein; these embodiments and modifications, as well as equivalents thereof, are also included within the scope of this invention.

What is claimed is:

1. An apparatus which comprises at least one semiconductor chip mounted on a substrate, said substrate comprising a porous, electrically conductive member having electrophoretically deposited thereon a coating of a polymeric material, said porous, electrically conductive member comprising graphite or a sintered metal.

2. An apparatus according to claim 1 wherein the polymeric material is an epoxy resin.

3. An apparatus according to claim 1 wherein the polymeric material is a polyethersulfone.

4. An apparatus according to claim 1 wherein the polymeric material is a polyarylene ether ketone.

5. An apparatus according to claim 1 wherein the polymeric material is of the formula

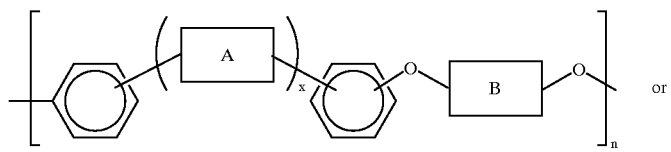

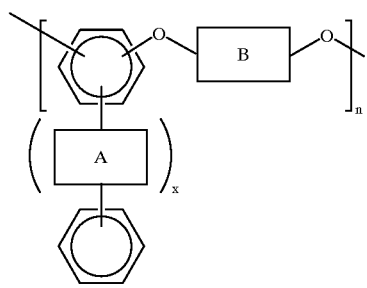
wherein x is an integer of 0 or 1, A is
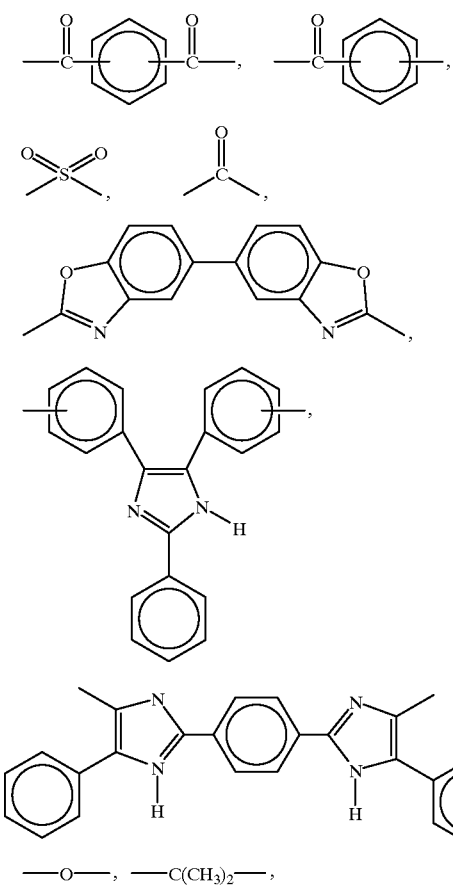
or mixtures thereof, B is
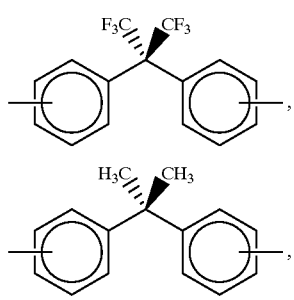
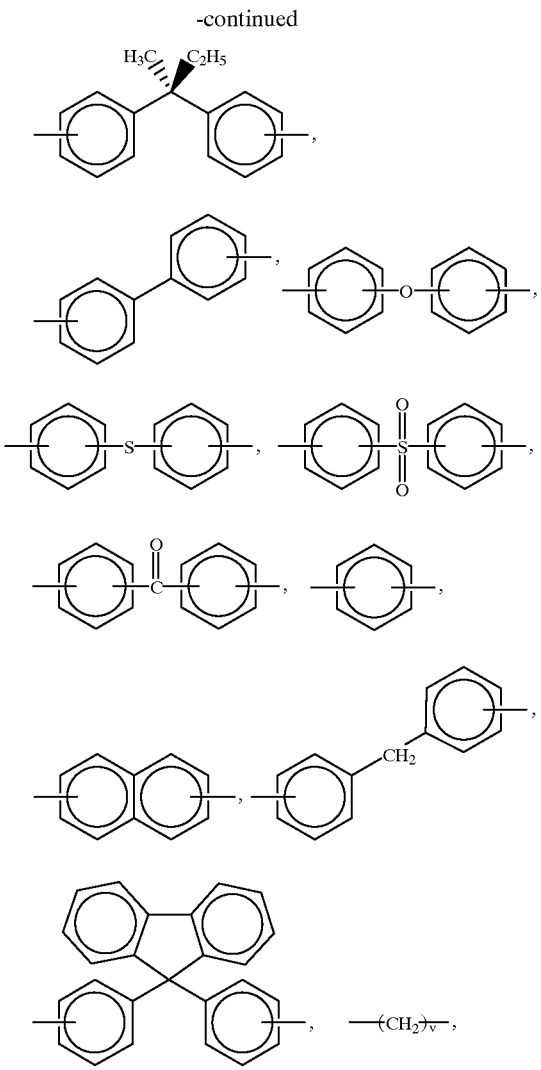
wherein v is an integer of from 1 to about 20,
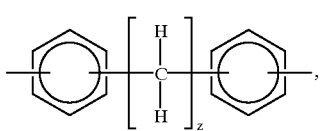

wherein z is an integer of from 2 to about 20,

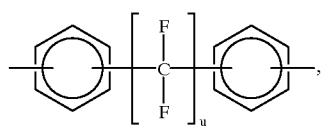

wherein u is an integer of from 1 to about 20,

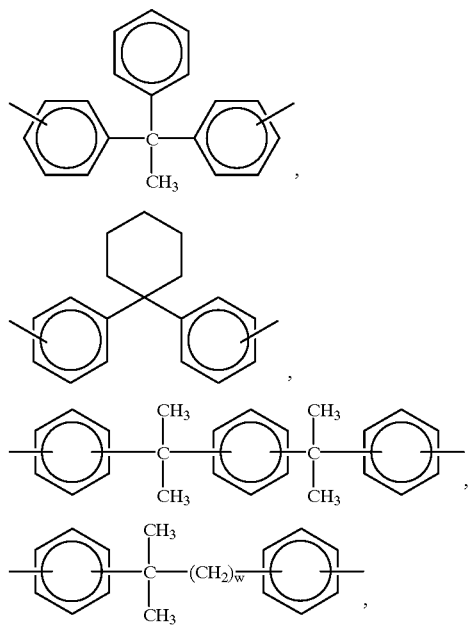

wherein w is an integer of from 1 to about 20,

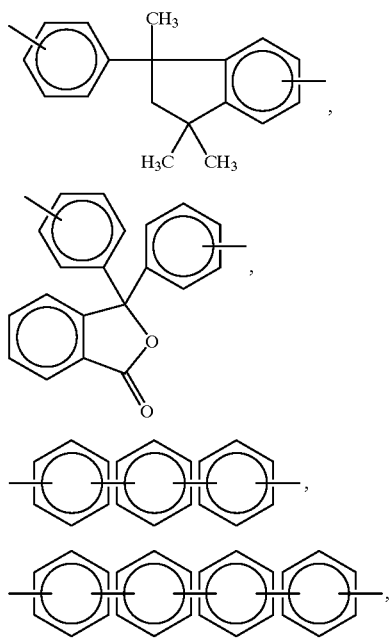

or mixtures thereof, and n is an integer representing the number of repeating monomer units.

6. An apparatus according to claim 5 wherein A is

and B is

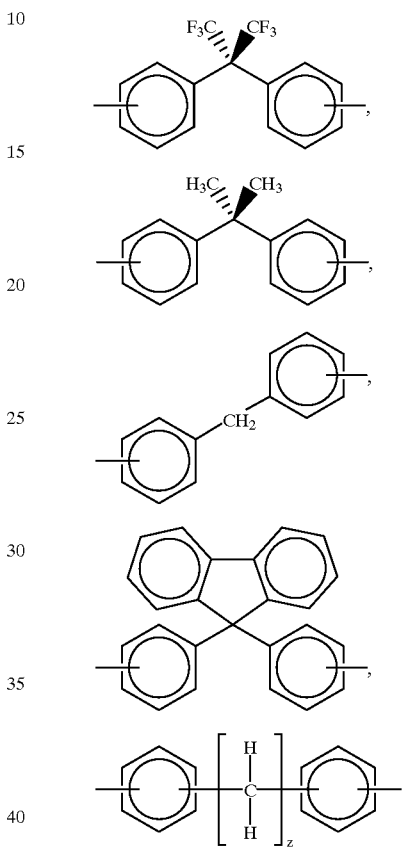

wherein z is an integer of from 2 to about 20, or a mixture thereof.

7. An apparatus according to claim 1 wherein the porous, electrically conductive member comprises graphite.

8. An apparatus according to claim 1 wherein the porous, electrically conductive member comprises a sintered metal.

9. An apparatus which comprises at least one semiconductor chip mounted on a substrate, said substrate comprising a porous, electrically conductive member having electrophoretically deposited thereon a coating of a polymeric material, wherein the polymer contains haloalkyl substituents, said polymer being of the formula

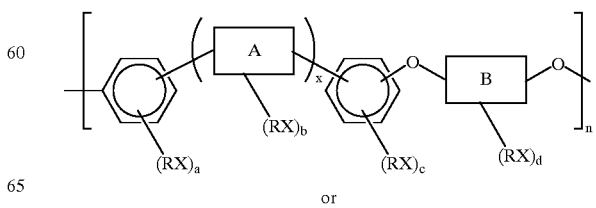

or

-continued
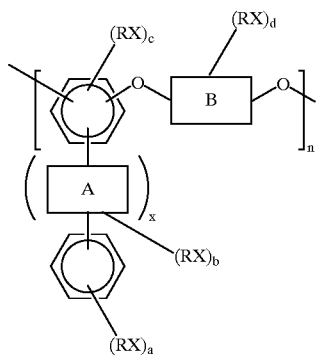
wherein x is an integer of 0 or 1, A is
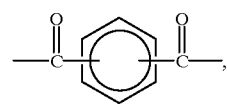
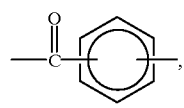
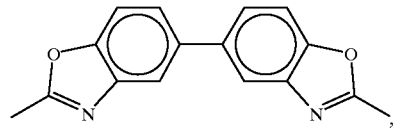
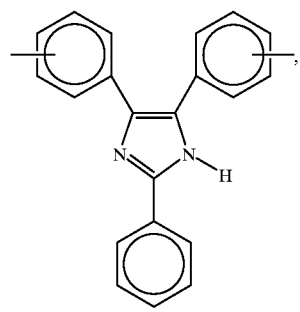
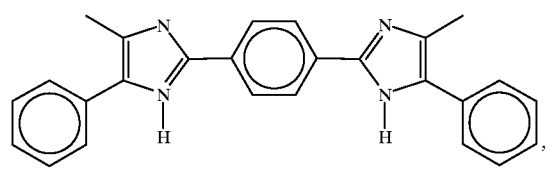
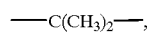
wherein v is an integer of from 1 to about 20,
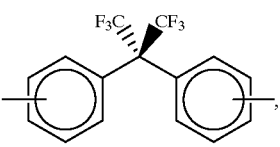
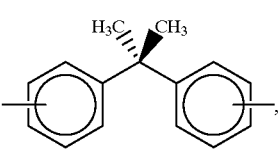
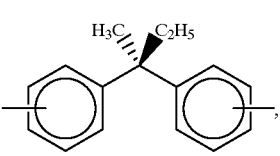
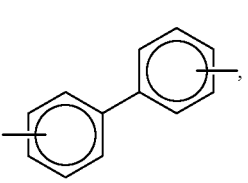
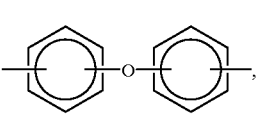
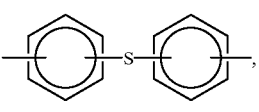
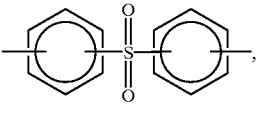
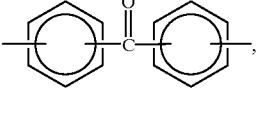
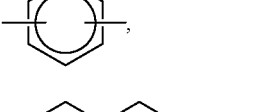
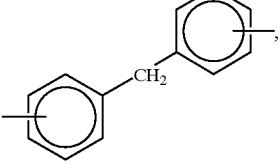

-continued

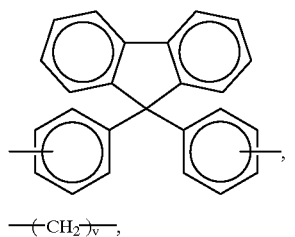

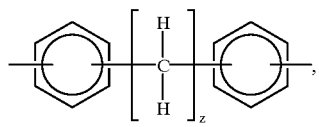

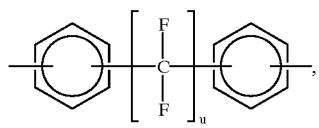

wherein z is an integer of from 2 to about 20,

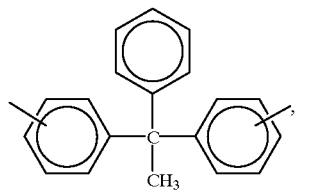

wherein u is an integer of from 1 to about 20,

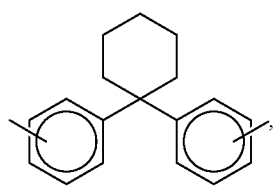

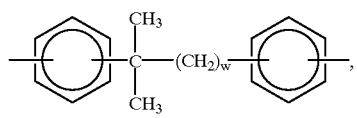

wherein w is an integer of from 1 to about 20,

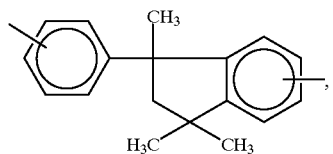

-continued

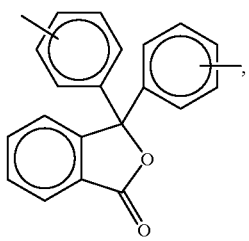

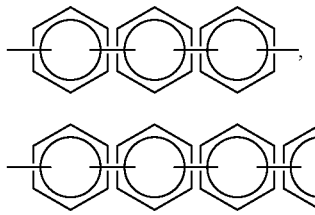

or mixtures thereof, and n is an integer representing the number of repeating monomer units, wherein R is an alkyl group or a substituted alkyl group, X is a halogen atom, and a, b, c, and d are each integers of 0, 1, 2, 3, or 4, provided that at least one of a, b, c, and d is equal to or greater than 1 in at least some of the monomer repeat units of the polymer.

10. An apparatus which comprises at least one semiconductor chip mounted on a substrate, said substrate comprising a porous, electrically conductive member having electrophoretically deposited thereon a coating of a polymeric material, wherein the polymer contains unsaturated ester substituents, said polymer being of the formula

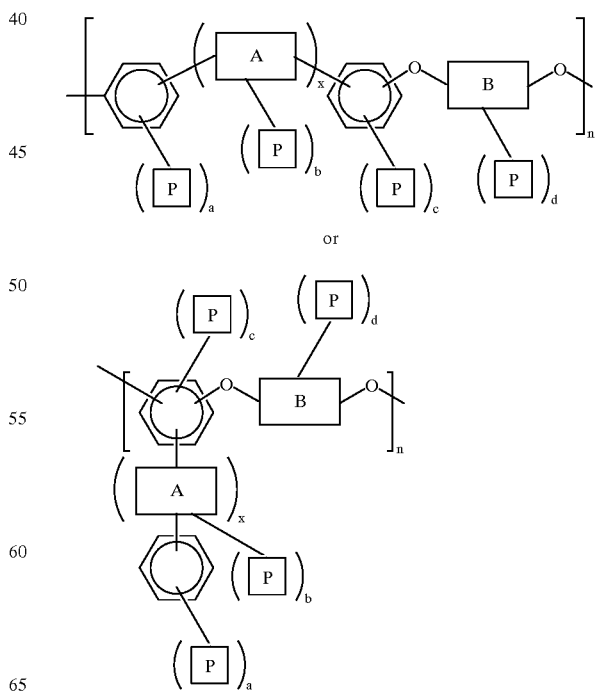

wherein x is an integer of 0 or 1, A is
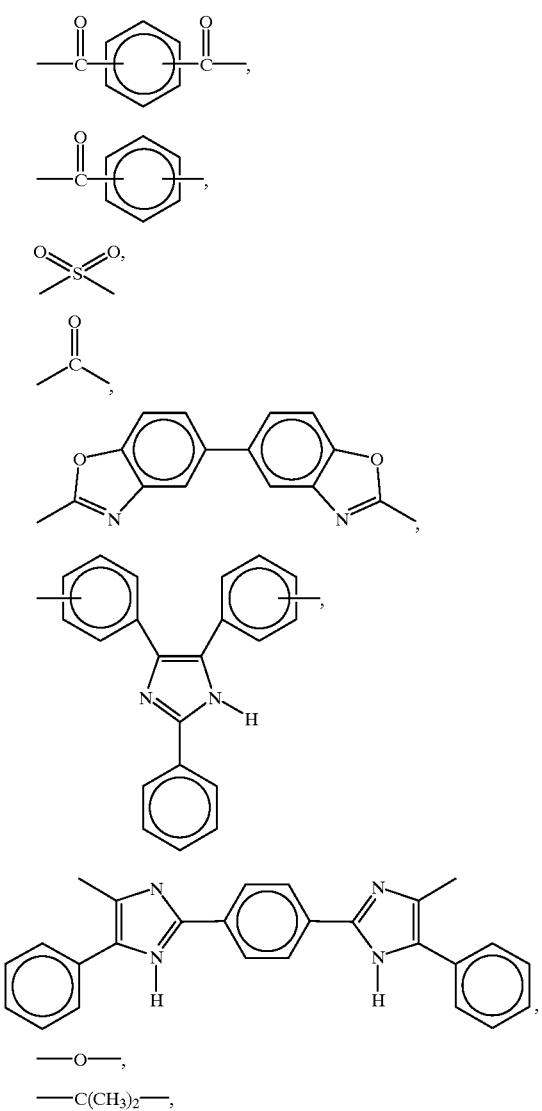
or mixtures thereof, B is
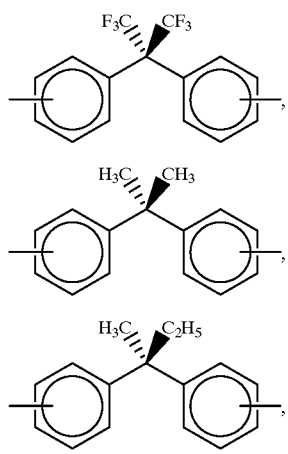
-continued
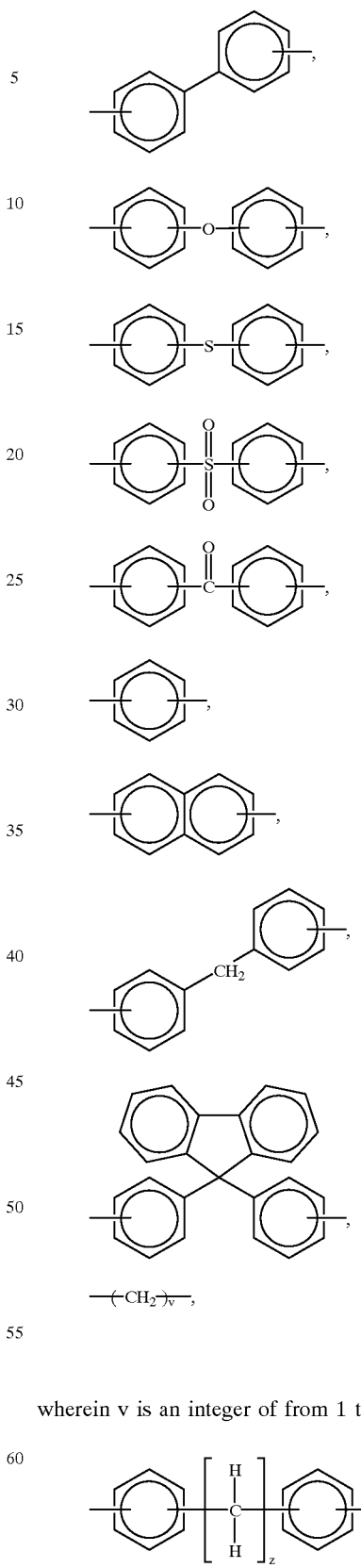
wherein v is an integer of from 1 to about 20,
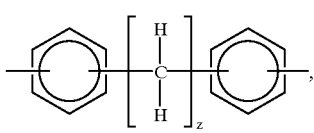

wherein z is an integer of from 2 to about 20,

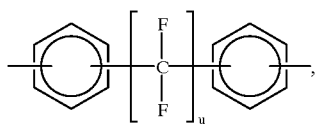

wherein u is an integer of from 1 to about 20,

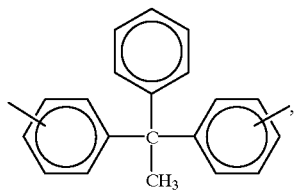

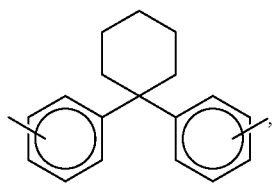

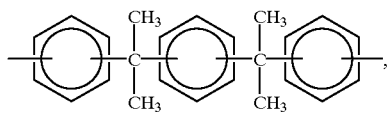

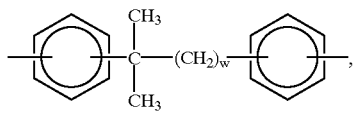

wherein w is an integer of from 1 to about 20,

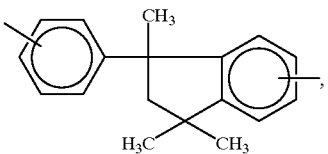

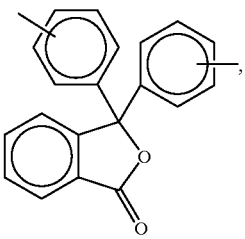

or mixtures thereof, and n is an integer representing the number of repeating monomer units, wherein P is an unsaturated ester group and a, b, c, and d are each integers of 0, 1, 2, 3, or 4, provided that at least one of a, b, c, and d is equal to or greater than 1 in at least some of the monomer repeat units of the polymer.

* * * * *